US009360162B2

(12) United States Patent
Larsen et al.

(10) Patent No.: US 9,360,162 B2

(45) Date of Patent: Jun. 7, 2016

(54) PRESSURE DELIVERY SYSTEM

(71) Applicant: MICRO MATIC A/S, Odense SV (DK)

(72) Inventors: Morten Helvig Larsen, Odense SV (DK); Andrée Thix, Troisvierges (LU); Morten Laugesen, Odense SV (DK)

(73) Assignee: MICRO MATIC A/S, Odense SV (DK)

( * ) Notice: Subject to any disclaimer, the term of this patent is extended or adjusted under 35 U.S.C. 154(b) by 120 days.

(21) Appl. No.: 14/359,959

(22) PCT Filed: Nov. 23, 2012

(86) PCT No.: PCT/EP2012/073504

§ 371 (c)(1),
(2) Date: May 22, 2014

(87) PCT Pub. No.: WO2013/076263

PCT Pub. Date: May 30, 2013

(65) Prior Publication Data

US 2014/0312042 A1 Oct. 23, 2014

(30) Foreign Application Priority Data

Nov. 23, 2011 (DK) ................................ 2011 70636

(51) Int. Cl.

*F16K 31/12* (2006.01)
*F17C 13/04* (2006.01)
*B67D 1/00* (2006.01)

(52) U.S. Cl.

CPC ................ *F17C 13/04* (2013.01); *B67D 1/008* (2013.01); *B67D 2001/0092* (2013.01); *F17C 2201/0119* (2013.01); *F17C 2205/013* (2013.01); *F17C 2205/0305* (2013.01);

(Continued)

(58) Field of Classification Search

CPC .................. Y10T 137/7808; Y10T 137/7811; Y10T 137/89719; Y10T 137/89757; Y10T 137/87965

See application file for complete search history.

(56) References Cited

U.S. PATENT DOCUMENTS 3,640,320 A 2/1972 Elkuch
5,732,735 A * 3/1998 Birch ........................ F17C 5/06 137/505.11

(Continued)

FOREIGN PATENT DOCUMENTS

CH 492 164 6/1970
CH 607 646 9/1978

(Continued)

OTHER PUBLICATIONS

Chinese Office Action issued May 5, 2015 in Chinese Application No. 201280067712.4, including search results, with partial English translation (12 pages).

(Continued)

*Primary Examiner* — R. K. Arundale

(74) *Attorney, Agent, or Firm* — Nixon & Vanderhye P.C.

(57) ABSTRACT

The present invention relates to a pressure delivery system for delivering a gas. The pressure delivery system comprises a gas cylinder containing at least one gas, the gas cylinder comprising an outlet, and the gas in the gas cylinder having a first gas pressure. The system further comprising a pressure reduction valve positioned downstream of the outlet for reducing the first gas pressure to a second gas pressure. Furthermore, the invention relates to a dispensing system for dispensing beverages.

17 Claims, 41 Drawing Sheets

(52) U.S. Cl.

CPC .................. *F17C 2205/0308* (2013.01); *F17C 2205/0314* (2013.01); *F17C 2205/0323* (2013.01); *F17C 2205/0329* (2013.01); *F17C 2205/0332* (2013.01); *F17C 2205/0338* (2013.01); *F17C 2205/0341* (2013.01); *F17C 2205/0373* (2013.01); *F17C 2205/0382* (2013.01); *F17C 2205/0385* (2013.01); *F17C 2221/014* (2013.01); *F17C 2221/03* (2013.01); *F17C 2223/0123* (2013.01); *F17C 2250/043* (2013.01); *F17C 2260/028* (2013.01); *F17C 2265/012* (2013.01); *F17C 2270/05* (2013.01); *F17C 2270/07* (2013.01); *Y10T 137/7811* (2015.04); *Y10T 137/87965* (2015.04)

(56) References Cited

U.S. PATENT DOCUMENTS

| | | | | | |
|---|---|---|---|---|---|
| 5,996,625 | A * | 12/1999 | Collado | G05D 16/10 | 137/505.25 |
| 8,171,950 | B2 * | 5/2012 | Colby | F16K 1/307 | 137/15.01 |
| 2005/0103383 | A1 * | 5/2005 | Carroll | G06Q 10/10 | 137/505.28 |
| 2006/0231142 | A1 * | 10/2006 | Schwartz | F17C 13/04 | 137/505.25 |
| 2007/0256743 | A1 * | 11/2007 | Carpenter | G05D 16/103 | 137/614.2 |
| 2008/0035221 | A1 | 2/2008 | Gawryjolek | | |
| 2009/0078321 | A1 * | 3/2009 | Arnott | F17C 13/00 | 137/14 |
| 2009/0166359 | A1 * | 7/2009 | Pisot | F16K 1/306 | 220/203.29 |
| 2012/0204976 | A1 * | 8/2012 | Newman | F41B 11/723 | 137/505.42 |
| 2013/0319390 | A1 * | 12/2013 | Newman | F41B 11/72 | 124/73 |

FOREIGN PATENT DOCUMENTS

| | | | |
|---|---|---|---|
| CN | 1176361 | A | 3/1998 |
| DE | 297 09 041 | | 6/1998 |
| DE | 199 27 667 | | 12/2000 |
| EP | 0 054 717 | | 6/1982 |
| FR | 89 935 | | 9/1967 |
| FR | 2 171 685 | | 9/1973 |
| GB | 2 089 954 | A | 6/1982 |
| JP | 52-62722 | A | 5/1977 |
| WO | WO 2006/011023 | | 2/2006 |

OTHER PUBLICATIONS

International Preliminary Report on Patentability issued in International Application No. PCT/EP2012/073504 dated May 27, 2014.

International Search Report for PCT/EP2012/073504, dated Mar. 5, 2013.

Written Opinion of the ISA for PCT/EP2012/073504, dated Mar. 5, 2013.

* cited by examiner

PRESSURE DELIVERY SYSTEM

This application is the U.S. national phase of International Application No. PCT/EP2012/073504 filed 23 Nov. 2012 which designated the U.S. and claims priority to DK Patent Application No. PA 2011 70636 filed 23 Nov. 2011, the entire contents of each of which are hereby incorporated by reference.

FIELD OF THE INVENTION

The present invention relates to a pressure delivery system for delivering a gas.

Furthermore, the invention relates to a dispensing system for dispensing beverages.

BACKGROUND ART

Known pressure delivery systems for delivering gas to a consumer system involve a high risk as well as a high level of discomfort for the users handling the gas cylinders due to their a high pressure.

The users are normally trained in handling these high pressure gas cylinders, and particularly in connecting and disconnecting the cylinders to/from consumer systems.

Since gas cylinders have a high outlet pressure, they are often connected by means of tools. The connection is often a threaded connection where a suitable tool is used to screw a connector onto a connecting pipe on the gas cylinder. However, many trained users do not like this way of handling cylinders.

Especially when pressure delivery systems are used in connection with beverage dispensing systems, there is a common fear among many users handling gas cylinders with a high gas pressure.

When beverage dispensing systems are used in bars, restaurants or the like, the staff is required to replace the gas cylinders when they are empty. However, the staff often objects to exchanging the gas cylinders due to a combination of insufficient training in handling high pressure gas cylinders, lack of experience with the use of the necessary tools, and the fact that the gas cylinders are often installed in places where they are difficult to reach. As a result, the gas cylinders are not replaced until a person with adequate courage and skills arrives.

SUMMARY OF THE INVENTION

It is an object of the present invention to wholly or partly overcome the above disadvantages and drawbacks of the prior art. More specifically, it is an object to provide an improved pressure delivery system which is easy to use and does not require tools for replacing gas cylinders.

It is furthermore an object of the present invention to provide a pressure delivery system which can easily be connected to gas consumer systems, such as a beverage dispensing system.

The above objects, together with numerous other objects, advantages, and features, which will become evident from the below description, are accomplished by a solution in accordance with the present invention by a pressure delivery system for delivering a gas, comprising a gas cylinder containing at least one gas, the gas cylinder comprising an outlet, and the gas in the gas cylinder having a first gas pressure, the pressure delivery system further comprising a pressure reduction valve positioned downstream of the outlet for reducing the first gas pressure to a second gas pressure.

Hereby, a gas delivery system is obtained in which a gas pressure is reduced to a level which facilitates handling, also by less trained users.

In an embodiment, a first valve may be arranged in the outlet of the gas cylinder.

Also, the first valve may be a consumption valve adapted to be opened by an external pressure body.

Moreover, the consumption valve may be a double valve comprising an internal gas valve and an external gas filling valve arranged concentrically around the internal gas valve.

Further, the pressure reduction valve may be arranged in the first valve or the consumption valve.

Additionally, the first valve may have a first end adapted to be connected with the outlet of the gas cylinder and a second end opposite the first end.

Said first end may comprise a male thread area adapted to be screwed into a female thread area arranged in the outlet of the gas cylinder.

The pressure reduction valve may be arranged upstream the internal gas valve of the consumption valve so that the first pressure of the gas in the gas cylinder is reduced to the second pressure before leaving the consumption valve.

In an embodiment, the first valve may be an on/off valve arranged between the outlet of the gas cylinder and the pressure reduction valve.

Furthermore, an outlet of the pressure reduction valve may be arranged either radially or axially in relation to the outlet of the gas cylinder.

Moreover, the pressure reduction valve may be releasably connected to the gas cylinder.

In an embodiment, the pressure delivery system may comprise an adaptor unit adapted to be connected to the outlet of the gas cylinder or the first valve.

Furthermore, the pressure reduction valve may be part of the adaptor unit.

In addition, the pressure reduction valve may comprise regulation means for regulating the second gas pressure.

Moreover, the system may comprise a connector or a pressure regulator device adapted to be connected to an outlet of the pressure reduction valve, the adaptor unit, the first valve or the consumption valve.

Also, the reduction valve may be part of the connector or the pressure regulator device.

The connector and the outlet of the reduction valve are connected without using tools.

The pressure reduction valve, the adaptor unit or the first valve, the connector or the pressure regulator device may comprise corresponding connection means so that connection is facilitated.

In addition, the pressure reduction valve, the adaptor unit or the first may comprise a male part and the connector or the pressure regulator device may comprise a female part, or vice versa. This facilitates connection of the parts since such a connection is obtained by sliding the female part onto the male part. Also, no tools are required for performing the connection.

The male part may comprise locking means adapted to mechanically engage corresponding locking means arranged in the female part. By implementing locking means, it is obtained that the connected parts are maintained and kept in position in relation to each other during use.

In an embodiment of the invention, the connector or the pressure regulator device may comprise an acoustic click indicator sending a signal when the connector is correctly connected to the reduction valve, the first valve or the adaptor unit and/or a visual indicator for indicating when the connector or the pressure regulator device is correctly connected to the reduction valve, the first valve or the adaptor unit.

Moreover, the system may comprise an additional reduction valve for reducing the second gas pressure to a third gas pressure.

Furthermore, the connector or the pressure regulator device may comprise the additional reduction valve.

The additional reduction valve may comprise regulation means for regulating the third gas pressure.

Also, the connector may comprise additional locking means adapted to mechanically hold the connector in a secure manner in relation to the outlet of the reduction valve, the adaptor unit or the on/off valve.

Moreover, the connector may comprise opening means for opening the on/off valve of the gas cylinder when being correctly connected.

In addition, the connector may comprise a security means for securing that the connector cannot be connected to the outlet of a reduction valve if the connector is damaged.

The system may comprise tamper-evident means.

In an embodiment, the reduction valve may comprise a handle for regulating the second gas pressure or a third gas pressure.

Furthermore, the reduction valve or the connector may comprise a gas indicator.

Additionally, the reduction valve or the connector may comprise a pressure indicator.

Moreover, the system may also comprise a safety relief valve.

The system may comprise a gas-filling channel so that the gas cylinder may easily be refilled with gas when empty.

Moreover, the gas may be $CO_2$, $N_2$ or a mixture of gasses.

The pressure reduction valve may be part of the gas cylinder.

In an embodiment, a gas filter may be arranged upstream the pressure reduction valve or the first valve.

Also, a pressure relief device may be arranged in the pressure reduction valve, the first valve, the connector and/or the pressure regulator device.

Said pressure relief device may comprise a burst disc.

Furthermore, a residual pressure mechanism may be arranged in the gas cylinder, the residual pressure mechanism being adapted to protect the gas cylinder when the gas pressure present in the gas cylinder drops below a predetermined level.

Moreover, the consumption valve may comprise a first end adapted to be connected with the outlet of the gas cylinder and a second end opposite the first end, the first end comprising a male thread area adapted to be screwed into a female thread area arranged in the outlet of the gas cylinder, the second end comprising a groove extending around an outside face of the valve, and the groove being adapted to engage with a projection of a connecting part.

The pressure delivery system as described above may further comprise a tool adapted to connect and disconnect a consumption valve to/from the outlet of a gas cylinder.

Further, the pressure delivery system as described above may comprise a gas filling device adapted to be connected with the consumption valve and to open the external gas filling valve of the consumption valve to a filling position.

In addition, the gas filling device may comprise a connecting part adapted to engage the consumption valve.

Also, the pressure delivery system as described above may comprise a consumer system utilising the gas in the gas cylinder, wherein the consumer system may be a beverage dispensing system, a welding system, a medical dispensing system, or a similar system Finally, the present invention relates to a dispensing system for dispensing beverages, comprising a pressure delivery system described above.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
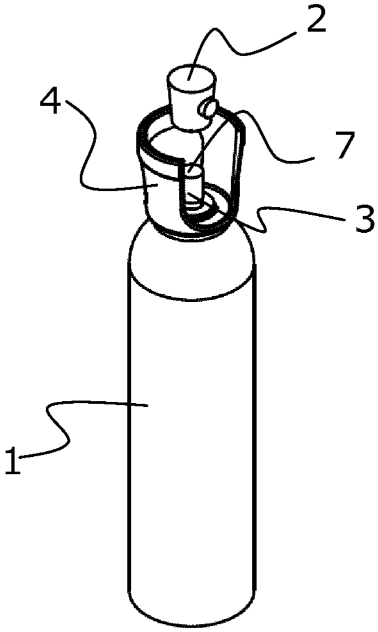
FIG. 1 shows a perspective view of a gas cylinder and a connector.
Figure 2:
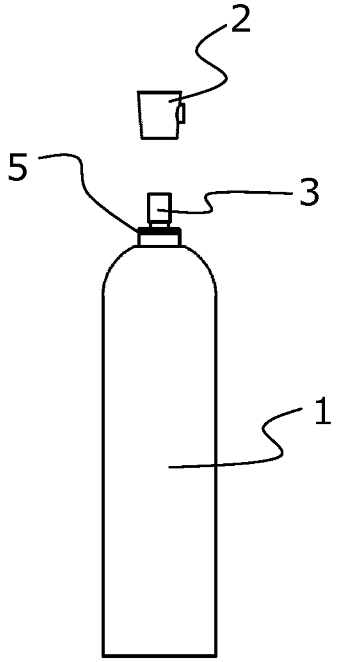
FIG. 2 shows a side view of the gas cylinder and the connector of FIG. 1.

FIGS. 1 and 2 show a gas cylinder 1 and a connector 2. The gas cylinder 1 and connector 2 are parts of a gas delivery system (not shown) according to the invention. In FIG. 1, a reduction valve 3 is arranged in the gas cylinder 1 for reducing the gas pressure in the gas cylinder 1 from a first gas pressure to a second gas pressure. The reduction valve 3 arranged in the gas cylinder 1 will be described below in connection with FIG. 5. Around the reduction valve 3, a shield 4 is arranged for protecting the reduction valve 3 and the gas cylinder outlet 5 against damage. In the embodiment shown in FIGS. 1 and 2, an outlet 7 of the reduction valve 3 is arranged axially in relation to the outlet 5 of the gas cylinder 1. In this embodiment, the reduction valve 3 is part of the gas cylinder 1.

Figure 3:
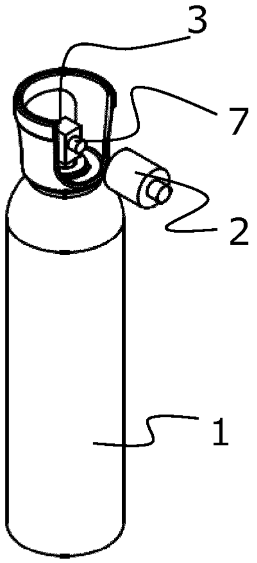
FIG. 3 shows a perspective view of another gas cylinder and a connector.
Figure 4:
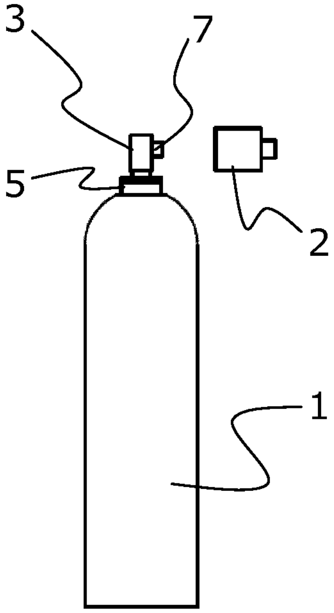
FIG. 4 shows a side view of the gas cylinder and the connector of FIG. 3.

FIGS. 3 and 4 show another gas cylinder 1 and a connector 2. The gas cylinder 1 and connector 2 are substantially identical to the gas cylinder 1 shown in FIGS. 1 and 2, however, in this embodiment, an outlet 7 of the reduction valve 3 is arranged radially in relation to the outlet 5 of the gas cylinder 1. Furthermore, the reduction valve 3 is, in this embodiment, part of the gas cylinder 1.

Figure 5:
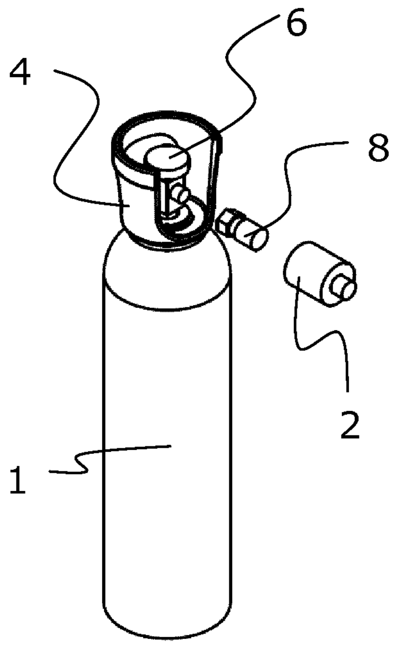
FIG. 5 shows a perspective view of another gas cylinder, an adaptor with a reduction valve and a connector.
Figure 6:
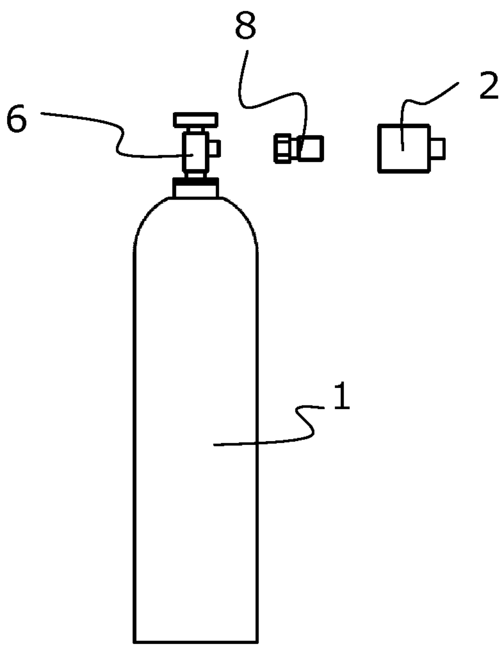
FIG. 6 shows a side view of the gas cylinder, the adaptor and the connector of FIG. 5.

FIGS. 5 and 6 show another embodiment of a gas cylinder 1. In this embodiment, the gas cylinder 1 is a commonly known gas cylinder having an on/off valve 6 placed at the outlet 5 of the gas cylinder. According to the invention, an adaptor unit 8 is adapted to be connected to the outlet of the on/off valve 6 of the gas cylinder 1. This connection may for instance be a common, threaded connection, eliminating the need for moderation of the known gas cylinders 1. Furthermore, the reduction valve (not shown) is part of the adaptor unit 8, enabling reduction of the gas pressure in the gas cylinder 1 from a first gas pressure to a second gas pressure. The connector 2 may additionally be connected to the adaptor unit 8. In this embodiment, the reduction valve is releasably connected to the gas cylinder 1.

Figure 7:
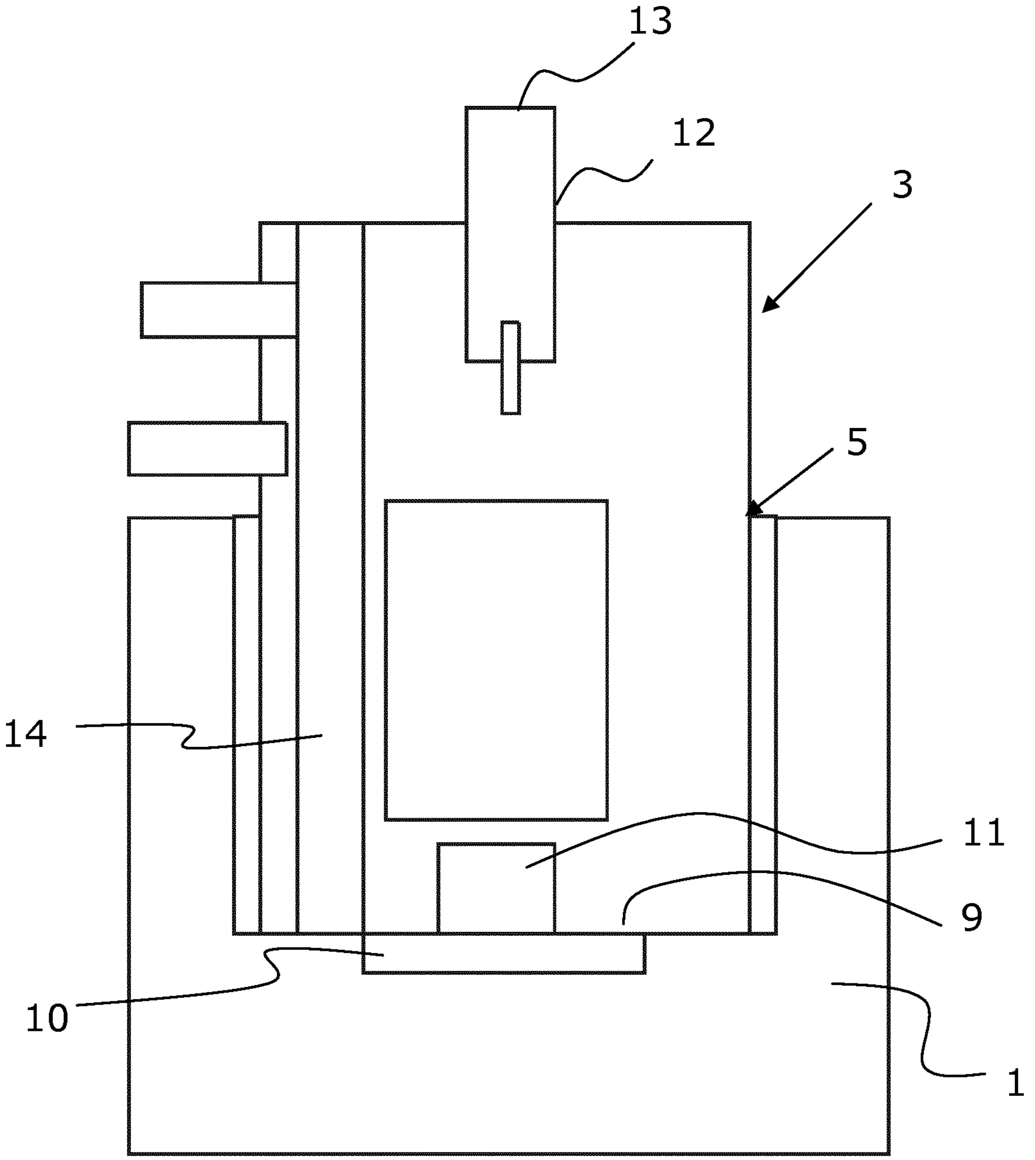
FIG. 7 shows a schematic view of an outlet of a gas cylinder wherein a reduction valve is arranged.

FIG. 7 shows a schematic view of an outlet 5 of a gas cylinder 1 in which a reduction valve is arranged. The reduction valve 3 is adapted to reduce the first gas pressure to a second gas pressure. The reduction valve 3 is screwed into the outlet 5 by means of a threaded connection. A filter 10 is arranged at the inlet 9 of the reduction valve 3 for filtering the gas before it enters the reduction valve 3. Downstream the filter 10, a residue unit 11 is arranged. At the outlet 12 of the reduction valve 3, connection means 13 are arranged, the connection means 13, in this embodiment, being formed as a male part adapted to connect to a female part (not shown).

The reduction valve 3 furthermore comprises a bypass mechanism 14 which may also include a gas-filling channel. The reduction valve may also comprise a gas cylinder indicator.

Figure 8:
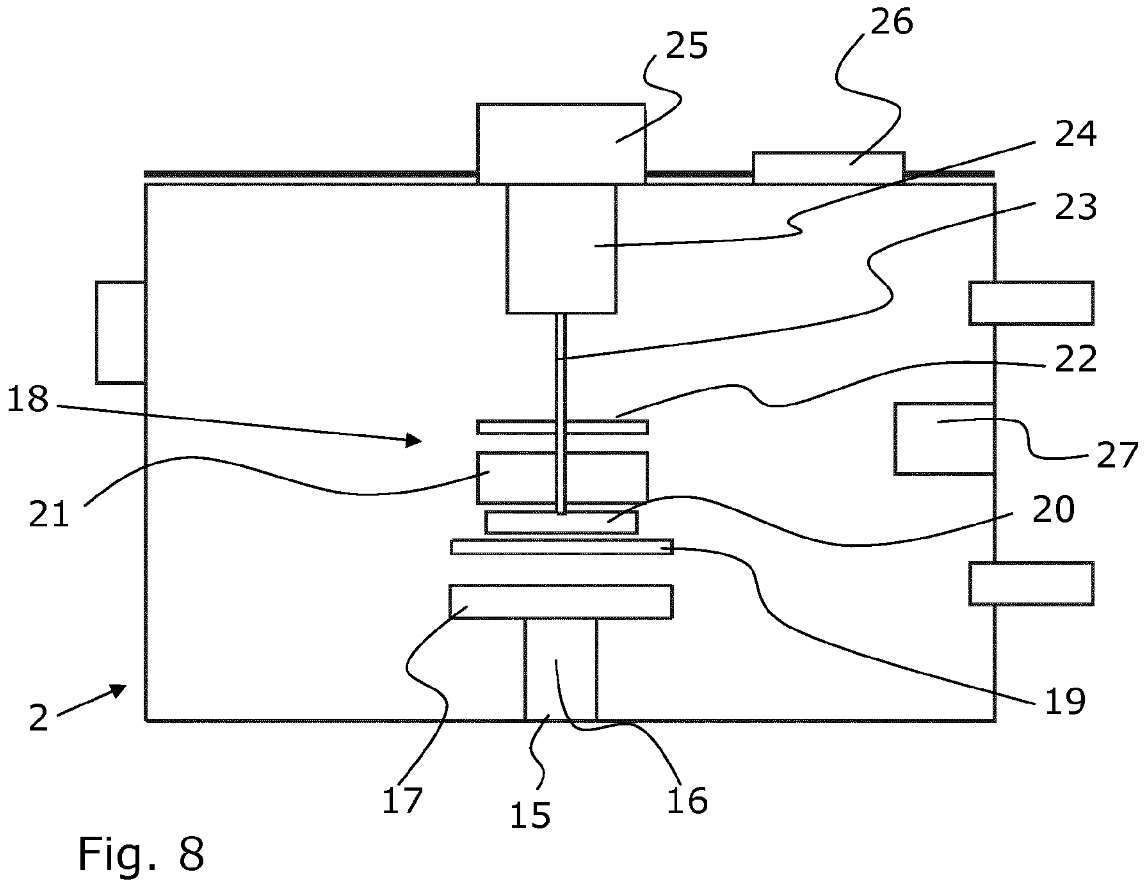
FIG. 8 shows a schematic view of a connector adapted to be connected to the gas cylinder of FIG. 7.

FIG. 8 shows a schematic view of a connector 2 adapted to be connected to for instance the gas cylinder of FIG. 7. At its inlet 15, the connector 2 comprises a connection means 16 in the form of a female part. The female part 16 is adapted to be connected to the male part (not shown) of the reduction valve. The connector 2 arranged at the female part 16 comprises an acoustic click indicator (not shown) providing a signal when the connector 2 is correctly connected to the outlet of the reduction valve. The connector 2 may also comprise a visual indicator (not shown) for indicating when the connector 2 is correctly connected to the outlet of the reduction valve.

Downstream the female part 16 and the inlet 15 of the connector 2, a gas filter 17 is arranged.

In this embodiment, the connector 2 comprises a second reduction valve 18 adapted to reduce the gas pressure from the second pressure to a third gas pressure, i.e. a pressure to be used in the consumer system.

In this embodiment, the second reduction valve 18 comprises a first valve seat 19, a valve sealing 20, a second valve seat 21 and a diaphragm 22. The valve sealing 20, the second valve seat 21 and the diaphragm 22 are connected via a self-venting pin 23 which in turn is connected to a regulator device 24 which again is connected to a handle 25. Hereby, it is possible to regulate the third gas pressure to a desired level to be used by the consumer system (not shown). The connector 2 may also comprise a pressure indicator 26, such as a manometer, so that the user can easily be provided with a gas pressure reading.

The connector 2 furthermore comprises an outlet 27 from which the gas may be delivered to the consumer system. The outlet 27 of the connector may comprise connection means in the form of a male/female connection or a threaded connection.

Figure 9:
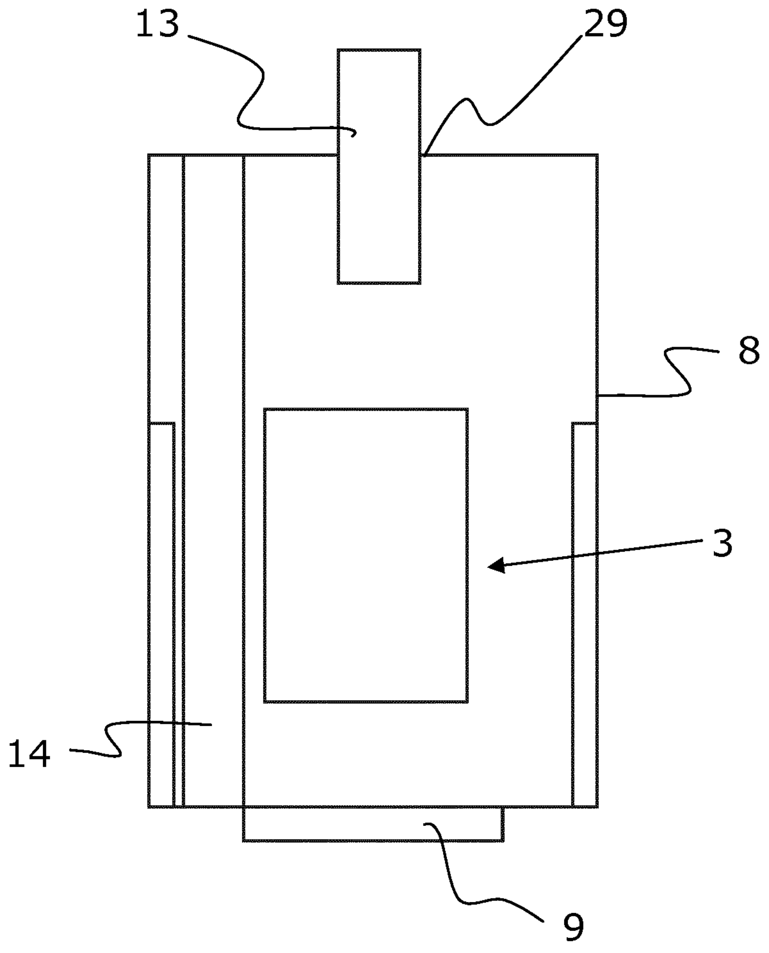
FIG. 9 shows a schematic view of an adaptor to be connected to an outlet of a gas cylinder.

FIG. 9 shows a schematic view of an adaptor unit 8 to be connected to an on/off valve of a gas cylinder (not shown). In this embodiment, the adaptor unit 8 comprises a threaded connection which is adapted to be screwed onto a corresponding thread on the gas cylinder. The adaptor unit 8 comprises a reduction valve 3 adapted to reduce the gas pressure from a first gas pressure (for instance around 60 bar) to a second gas pressure (for instance around 10 bar). Also, as mentioned above, the adaptor unit 8 may comprise a gas filter 9 at the inlet. At the outlet 29 of the adaptor unit 8, connection means 13 are arranged, the connection means 13, in this embodiment, being formed as a male part adapted to connect to a female part (not shown). The connector shown in FIG. 8 may be connected to the male part 13 of the adaptor unit 8.

The adaptor unit 8 furthermore comprises a bypass mechanism 14 which may also include a gas-filling channel. In another embodiment, the adaptor unit 8 may be arranged as a normal adaptor for facilitating connection of the outlet of an on/off valve on an existing, known gas cylinder and a reduction valve. In such an embodiment, the adaptor unit 8 does not have a gas pressure regulation means.

Figure 10:
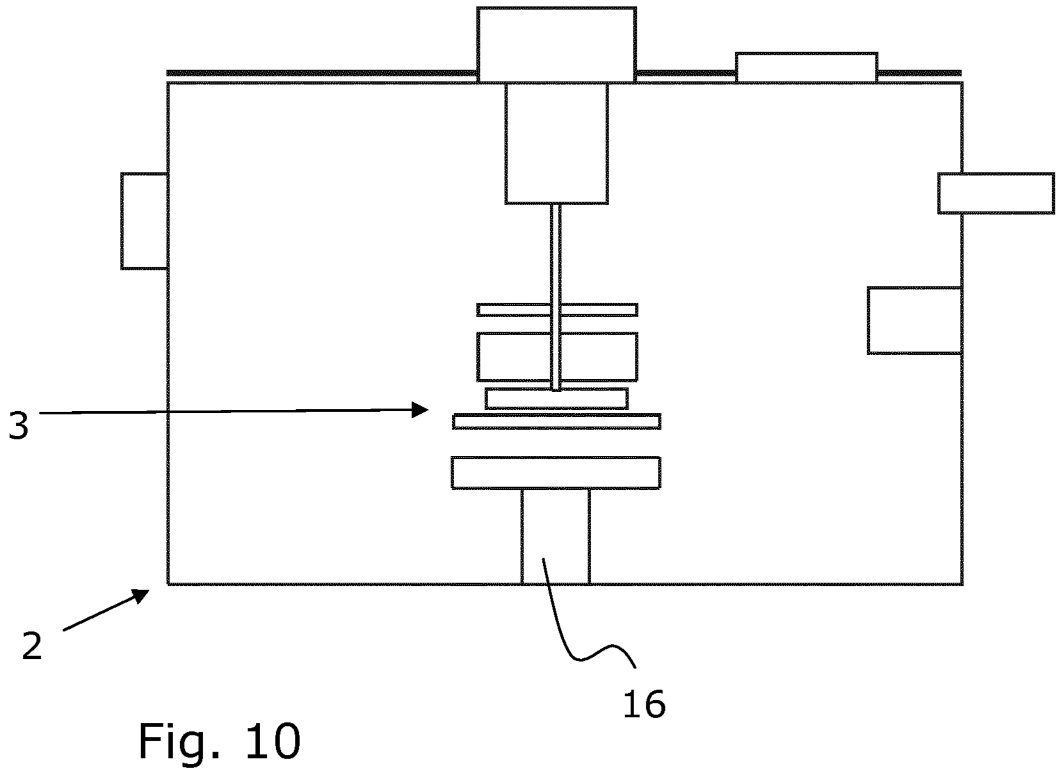
FIG. 10 shows a schematic view of a connector comprising a reduction valve.
Figure 11:
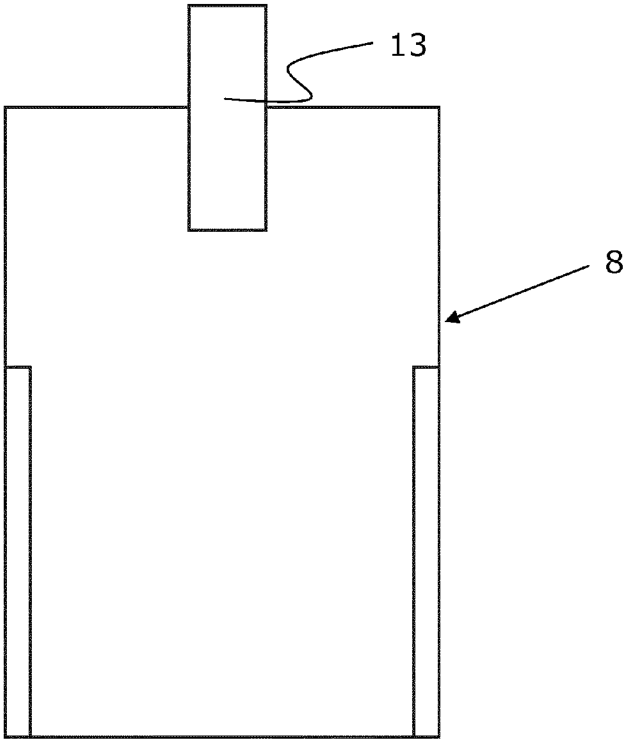
FIG. 11 shows a schematic view of another embodiment of an adaptor to be connected to the gas cylinder.

FIG. 10 shows a schematic view of another embodiment of a connector 2 comprising a reduction valve 3. The reduction valve 3 is substantially the same as that described in connection with FIG. 8 and will not be described in any more detail here. The connector 2 also comprises a connection means in the form of a female part 16 adapted to be connected to the male part 13 of another embodiment of an adaptor unit 8, as shown in FIG. 11. The adaptor unit 8 does not comprise a reduction valve and is directly connected to the gas cylinder (not shown).

The connector 2 shown in FIG. 10 is adapted to reduce the first gas pressure to a second gas pressure. The connector 2 may comprise additional locking means (not shown) adapted to mechanically hold the connector 2 in a secure manner in relation to the adaptor unit 8.

Furthermore, the connector 2 or the adaptor unit 8 may comprise opening means for opening the on/off valve of the gas cylinder when being correctly connected.

Also, the connector 2 may comprise a security means for securing that the connector 2 cannot be connected to the outlet of the reduction valve or the adaptor unit if the connection means of the connector or the connection means of the reduction valve or the adaptor unit has been damaged.

Figure 12:
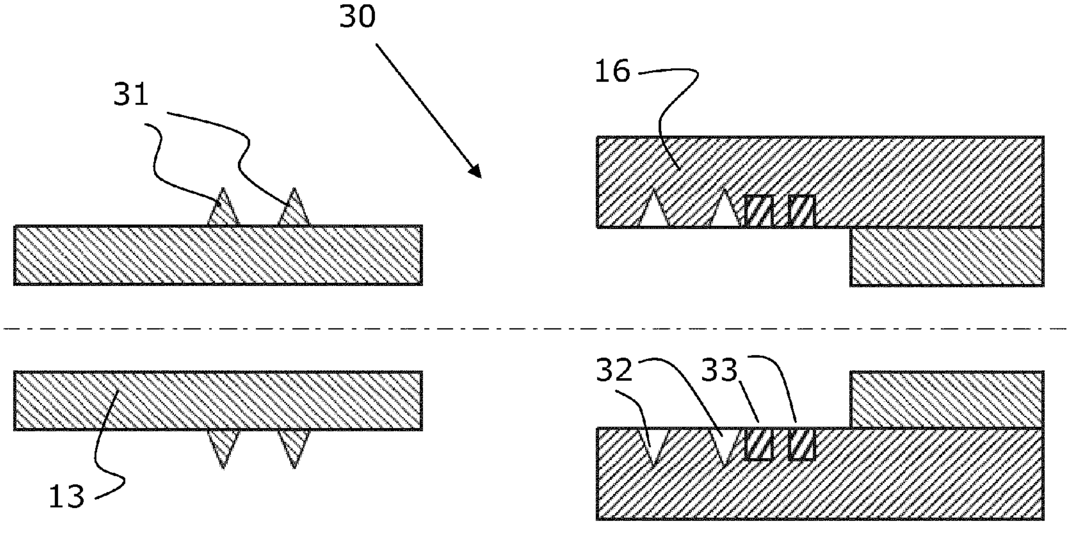
FIG. 12 shows a schematic view of a male/female connection in cross-section.

FIG. 12 shows a schematic cross-sectional view of a male/female connection 30. The male part 13 comprises projections 31 in the form of locking means, and the female part 16 comprises recesses 32 to the projections 31 corresponding locking means so that the locking means 31, 32 mechanically engage each other in the connected state of the male/female connection, thereby fixating the connection 30 in a secure manner. The female part 16 may also comprise sealings 33 ensuring that the connection 30 is leak-tight.

Figure 13A:
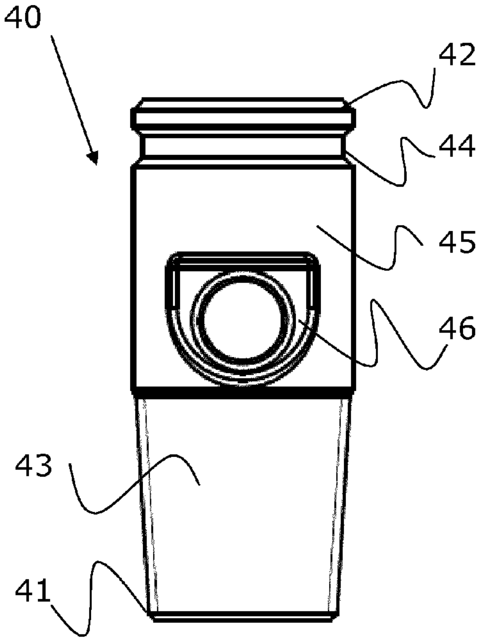
FIGS. 13*a*-13*d* show, in different views, an embodiment of a consumption valve before it is inserted into a gas cylinder.

FIGS. 13*a*-13*d* show an embodiment of a first valve, for instance a consumption valve 40, before it is inserted into a gas cylinder in different views. In FIG. 13*a* the consumption valve 40 is shown in a front view. In this embodiment, the consumption valve 40 comprises a first end 41 adapted to be connected with the outlet (not shown) of the gas cylinder and a second end 42 opposite the first end 41. The first end 41 comprises a male thread area 43 adapted to be screwed into a female thread area (not shown) arranged in the outlet of the gas cylinder. The second end 42 comprises a groove 44 extending around an outside face 45 of the valve, the groove 44 being adapted to engage with a projection of a connecting part (not shown).

Figure 13B:
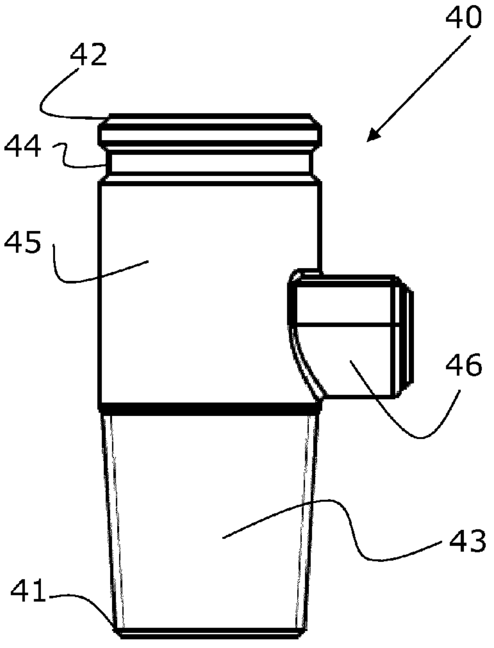
Figure 13C:
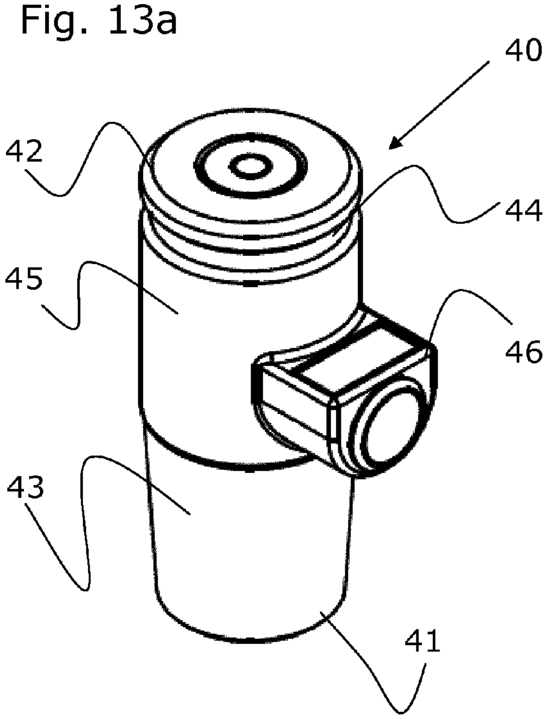
Figure 13D:
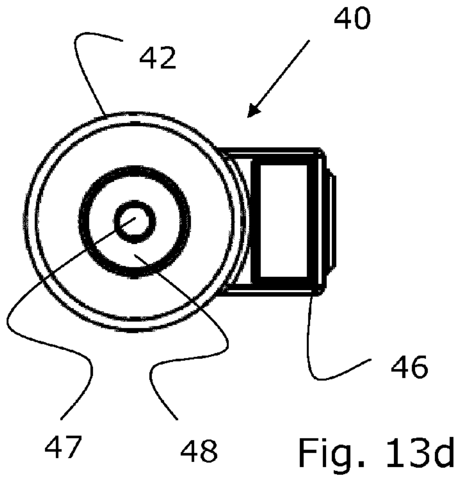

The consumption valve 40 also comprises a pressure relief device 46 arranged between the first and second ends 41, 42. As shown in FIGS. 13*b*-13*d*, the pressure relief device 46 is projecting radially out from the outside face of the valve 40.

In FIG. 13*d*, the consumption valve 40 is seen in a top view. In this embodiment the consumption valve 40 is a double valve comprising an internal gas valve 47 and an external gas filling valve 48 arranged concentrically around the internal gas valve 47. This will be described further below. Furthermore, the consumption valve 40 has an axial outlet. In other embodiments this may be a radial outlet.

Figure 14:
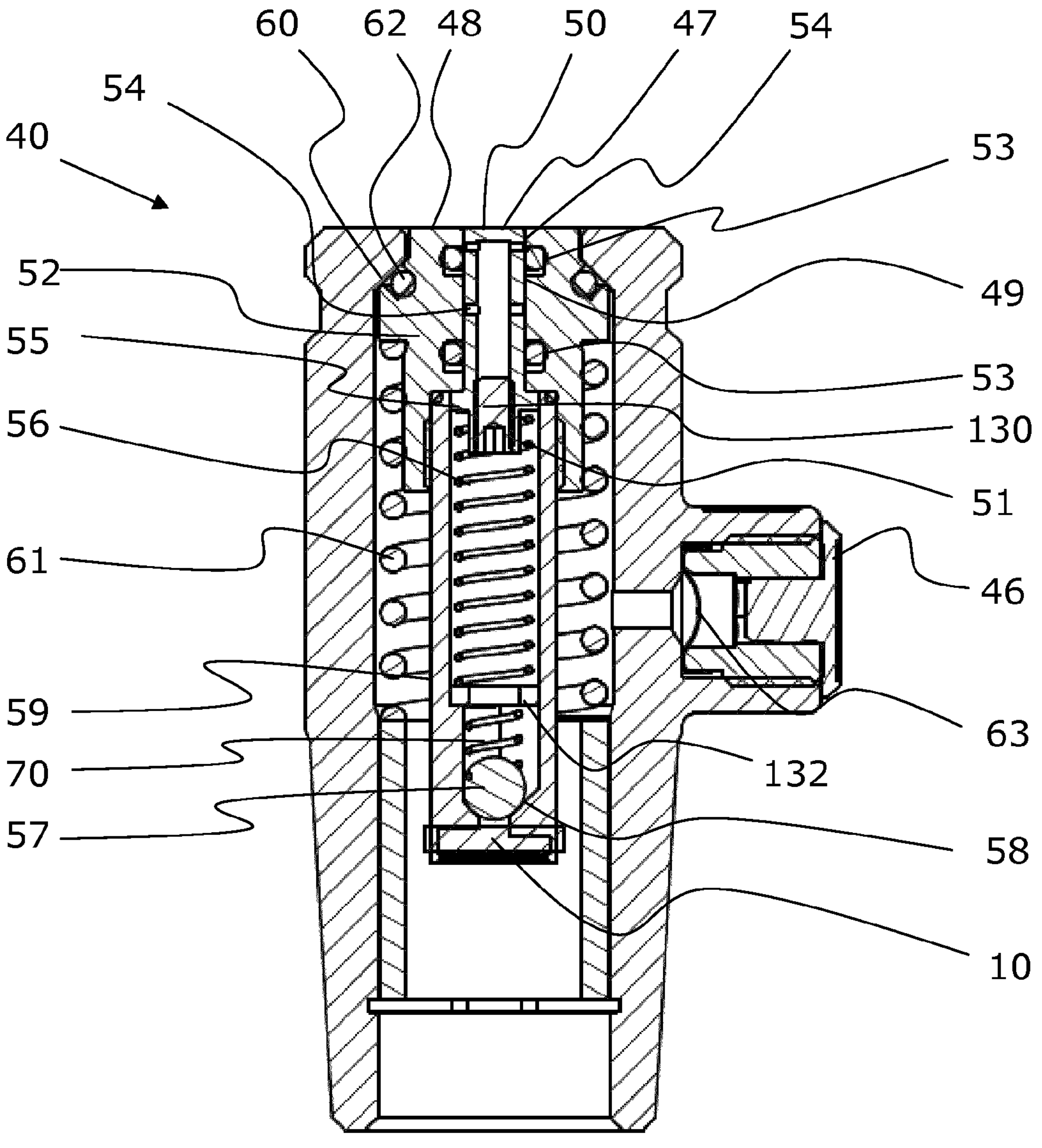
FIG. 14 shows an embodiment of a consumption valve in a cross-sectional view in a closed position.

FIG. 14 shows an embodiment of a consumption valve 40 in a cross-sectional view in a closed position of the valve. In this embodiment the consumption valve 40 is a double valve having the internal gas valve 47 and the external gas filling valve 48 arranged concentrically around the internal gas valve 47. The internal gas valve 47 is the valve which by activation, i.e. when opened, is able to let the gas present in the gas cylinder out to consumption in a consumer system.

Seen from the top, the internal gas valve 47 comprises a displaceable hollow member 49 being closed in a first end 50 and closed in a second end 51 by means of a plug 130 or the like. The hollow member 49 is axially displaceable within a bore of a valve part 52 of the external gas filling valve 48. Sealings 53 have been arranged in grooves in the valve part 52 facing the bore, so that the exterior of the hollow member 49 is sealed off. The sealings 53 may advantageously be O-rings. Openings 54 are furthermore arranged in the hollow member 49.

At the second end 51 of the hollow member 49, an exterior flange 55 is arranged. The flange 55 serves as a support for a helical spring 56 extending in an axial direction. A ball 57 is adapted to abut a ball seat 58 and is axially displaceable within a second bore. A spring 70 is extending between the ball 57 and a stop 132 arranged above the ball in the second bore. The ball 57 and the spring 70 function as a residual pressure mechanism and is adapted to protect the gas cylinder when the gas pressure present in the gas cylinder drops below a predetermined level. When the pressure present in the gas cylinder is lower than the spring force of the spring 70, the ball 57 will be pressed downwards against the ball seat 58 so that the residual pressure in the gas cylinder 1 is maintained whereby it is obtained that the gas cylinder is protected.

Furthermore, the spring 56 is adapted to keeping the hollow member 49 in its closed position when no external force has been applied to the hollow member 49 at the first end 50. Furthermore, the hollow member 49, the spring 56 and the ball 57 are arranged inside a tubular part 59, which again is positioned by the valve part 52. A gas filter 10 is arranged below the ball seat 58 for filtering any residues from the gas before it leaves the gas cylinder.

The external gas filling valve 48 comprises the valve part 52 which is pressed up against a valve seat 60 by means of a helical spring 61. A sealing 62 is furthermore arranged between the valve seat 60 and the valve part 52. In this embodiment, the sealing 62 is arranged in a groove positioned in the valve part.

The consumption valve 40 also comprises a pressure relief device 46 comprising a burst disc 63.

Figure 15:
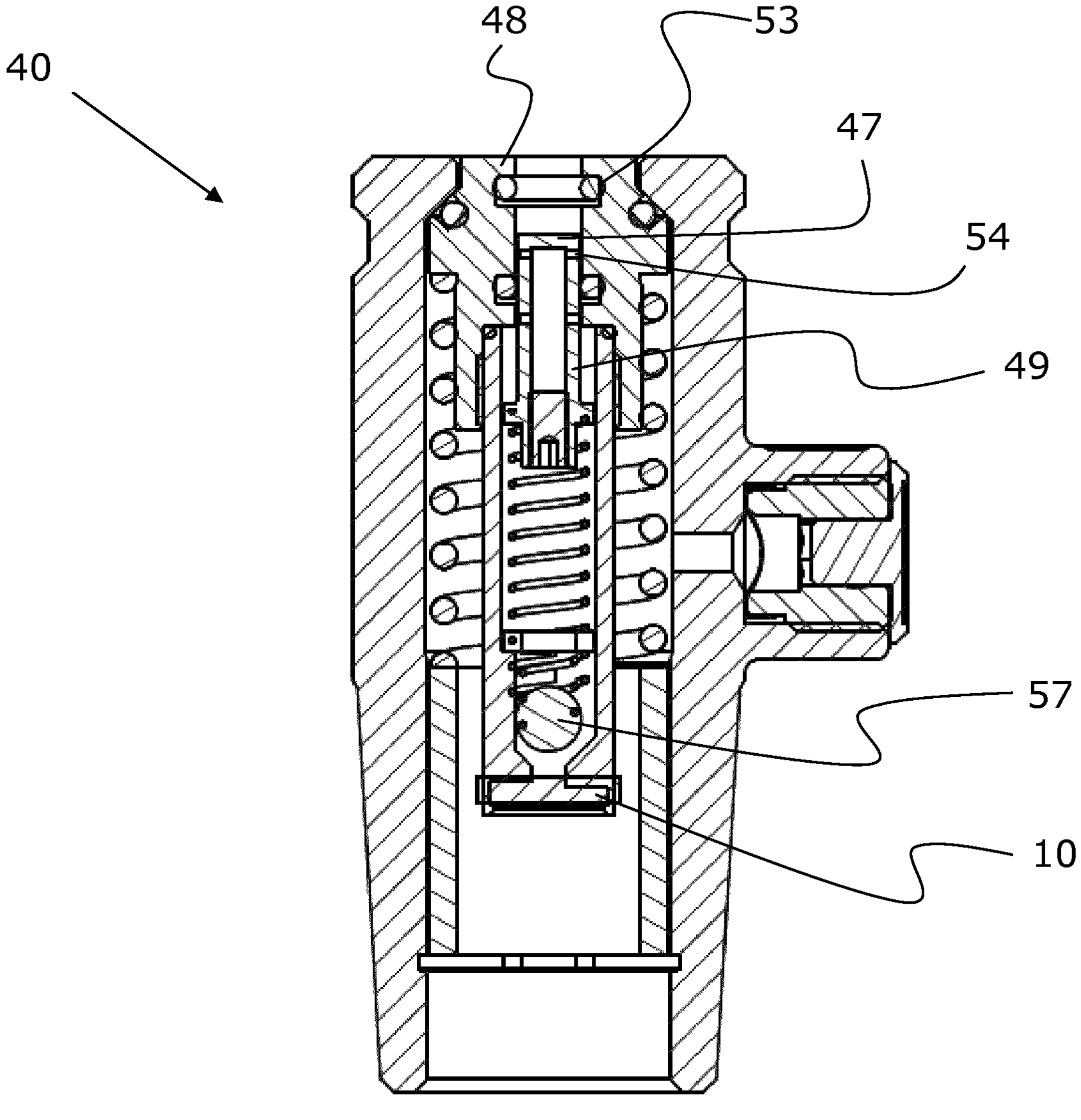
FIG. 15 shows the consumption valve of FIG. 14 in a cross-sectional view in an open position for consumption of a gas.

In FIG. 15, the consumption valve 40 of FIG. 14 is shown in a cross-sectional view in an open position for consumption of a gas through the internal gas valve 47. In this embodiment, the internal gas valve 47 has been displaced downwards by means of an external pressure body (not shown), which is connected to a pressure reduction valve (not shown). As it appears, the hollow member 49 has been moved downwards and past the upper sealing 53, so that the gas present in the gas cylinder may flow via the filter 10 past the ball 57 up through the lower openings of hollow member 49, inside the hollow member 49 and out of the upper opening 54 in the hollow member, and from there into the pressure reduction valve (not shown). The external gas filling valve 48 is still closed.

Figure 16:
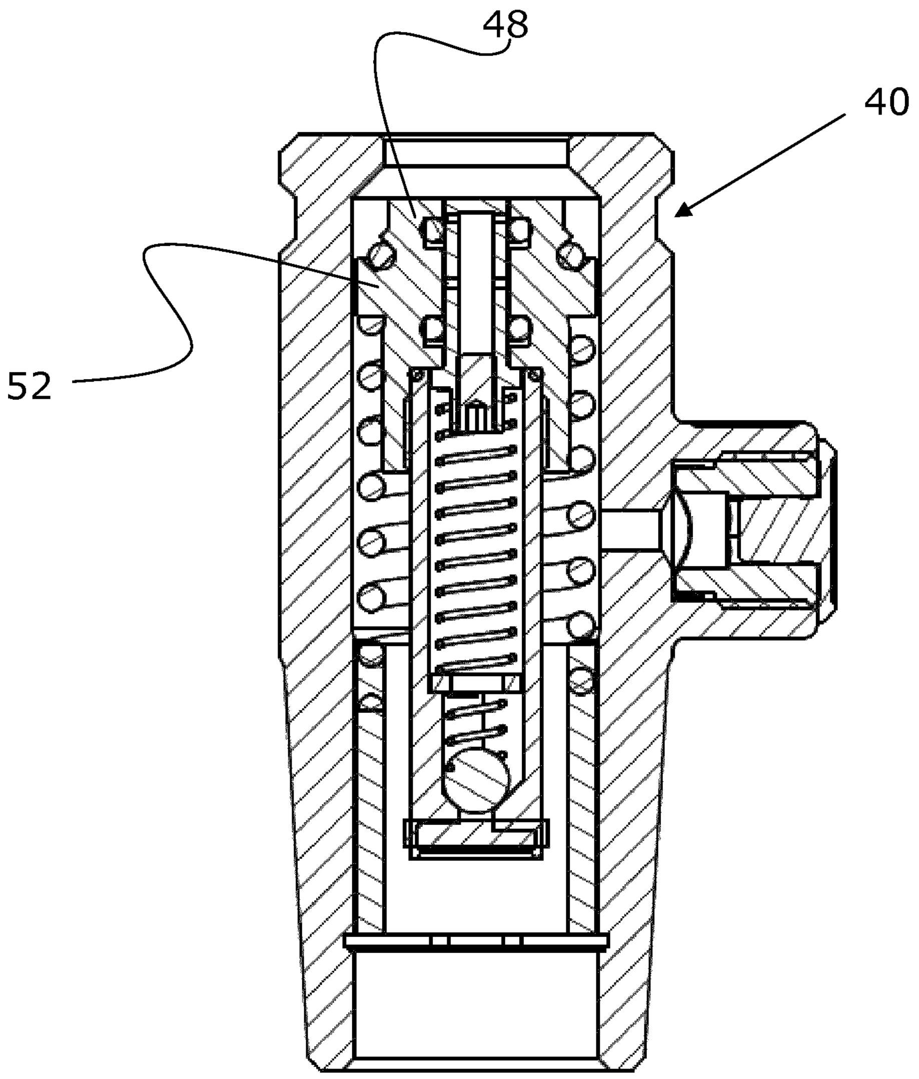
FIG. 16 shows the consumption valve of FIG. 14 in a cross-sectional view in an open position for filling the gas cylinder with gas.

In FIG. 16, the consumption valve 40 of FIG. 14 is shown in a cross-sectional view in an open position for filling the gas cylinder (not shown) with gas. Here the external gas filling valve 48 is open since the valve part 52 has been displaced downwards by a filling unit (not shown) adapted to be connected with the valve 40.

Figure 17:
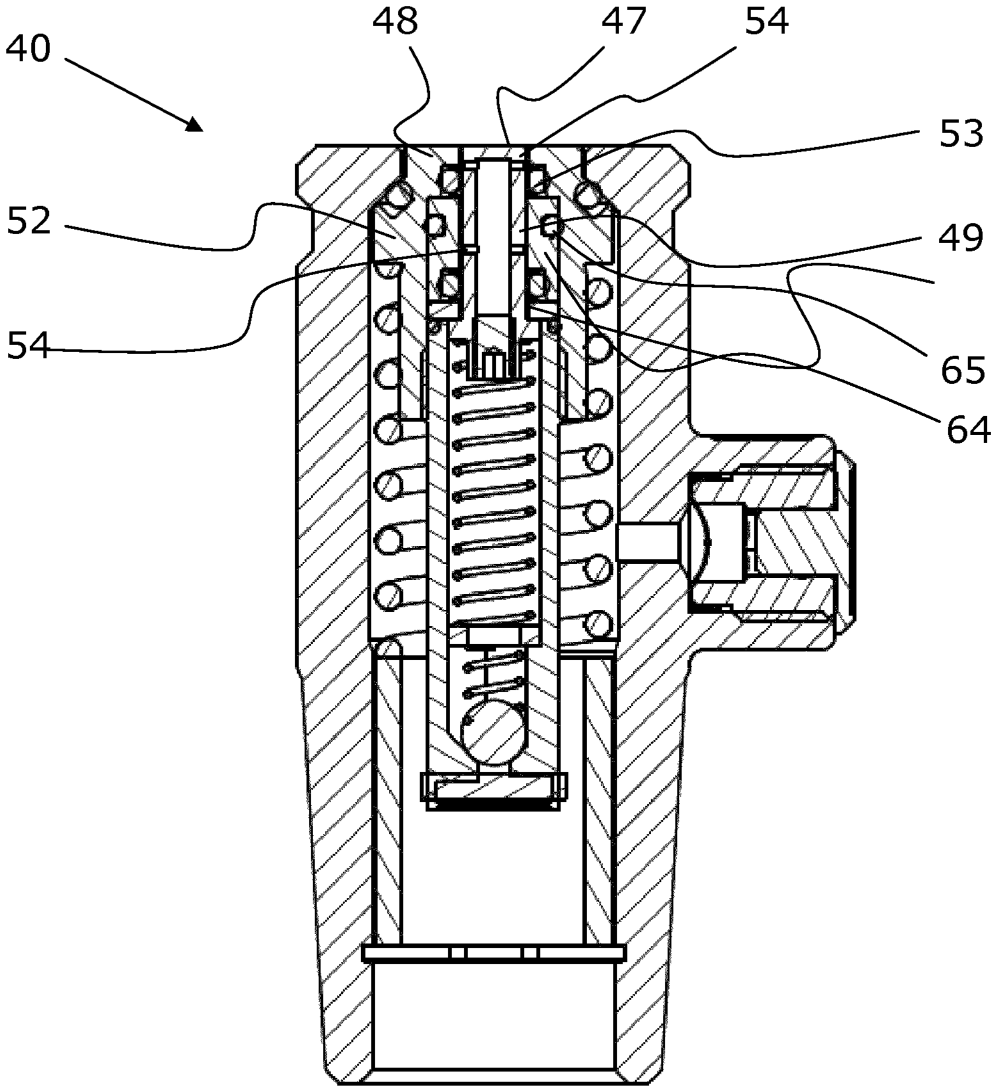
FIG. 17 shows another embodiment of a consumption valve in a cross-sectional view in a closed position.

FIG. 17 shows another embodiment of a consumption valve 40 in a cross-sectional view in a closed position of the valve. The consumption valve 40 has substantially the same design as that shown in FIGS. 14-16 and is also a double valve having the internal gas valve 47 and the external gas filling valve 48 arranged concentrically around the internal gas valve 47. In this embodiment, the hollow member 49 is displaceable with the valve part 52 and an inner sleeve 64. The upper sealings 53 are arranged in the valve part 52, and the lower sealings 53 are arranged in the inner sleeve 64 facing the outer face of the hollow member 49. The inner sleeve 64 is adapted to support the sealings so that they are maintained in position and do not lose their sealing properties. A sealing 65 is arranged between the inner sleeve and valve part 52. The hollow member 49 still has openings 54. The ball 57 has the same function as a residual pressure mechanism as described above.

Figure 18:
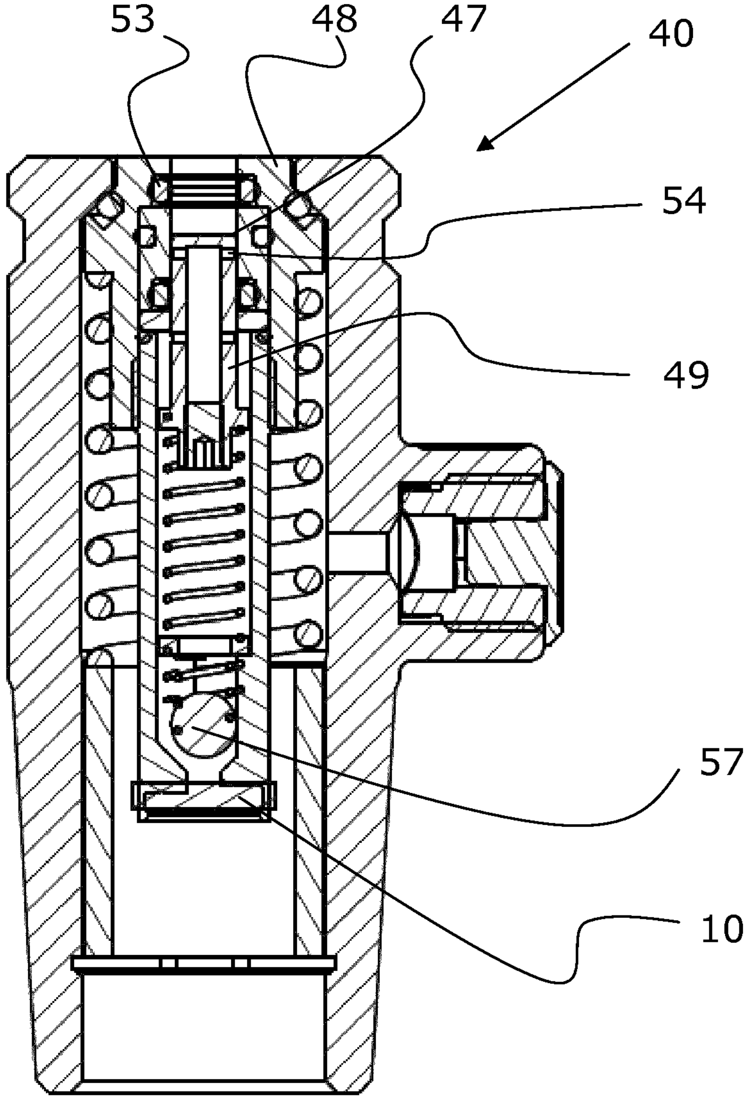
FIG. 18 shows the consumption valve of FIG. 17 in a cross-sectional view in an open position for consumption of a gas.

In FIG. 18, the consumption valve 40 of FIG. 17 is shown in a cross-sectional view in an open position for consumption of a gas through the internal gas valve 47. In this embodiment, the internal gas valve 47 has been displaced downwards by means of an external pressure body (not shown), which is connected to a pressure reduction valve (not shown). As it appears, the hollow member 49 has been moved downwards and past the upper sealing 53, so that the gas present in the gas cylinder may flow via the filter 10 past the ball 57 up through lower openings of hollow member 49, inside the hollow member 49, and out of the upper opening 54 in the hollow member, and from there into the pressure reduction valve (not shown). The external gas filling valve 48 is still closed.

Figure 19:
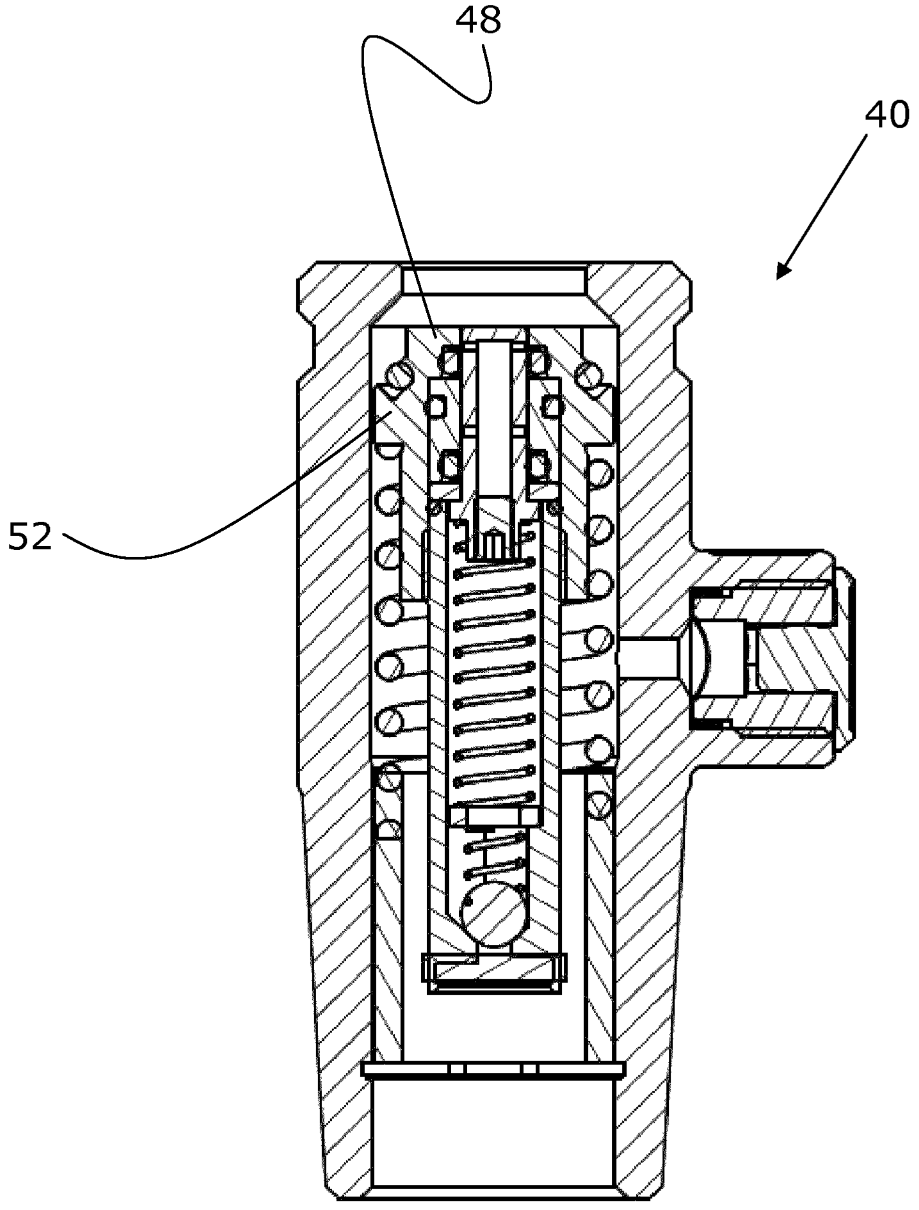
FIG. 19 shows the consumption valve of FIG. 17 in a cross-sectional view in an open position for filling the gas cylinder with gas.

In FIG. 19, the consumption valve 40 of FIG. 17 is shown in a cross-sectional view in an open position for filling the gas cylinder (not shown) with gas. Here the external gas filling valve 48 is open since the valve part 52 has been displaced downwards by a filling unit (not shown) adapted to be connected with the valve 40.

Figure 20:
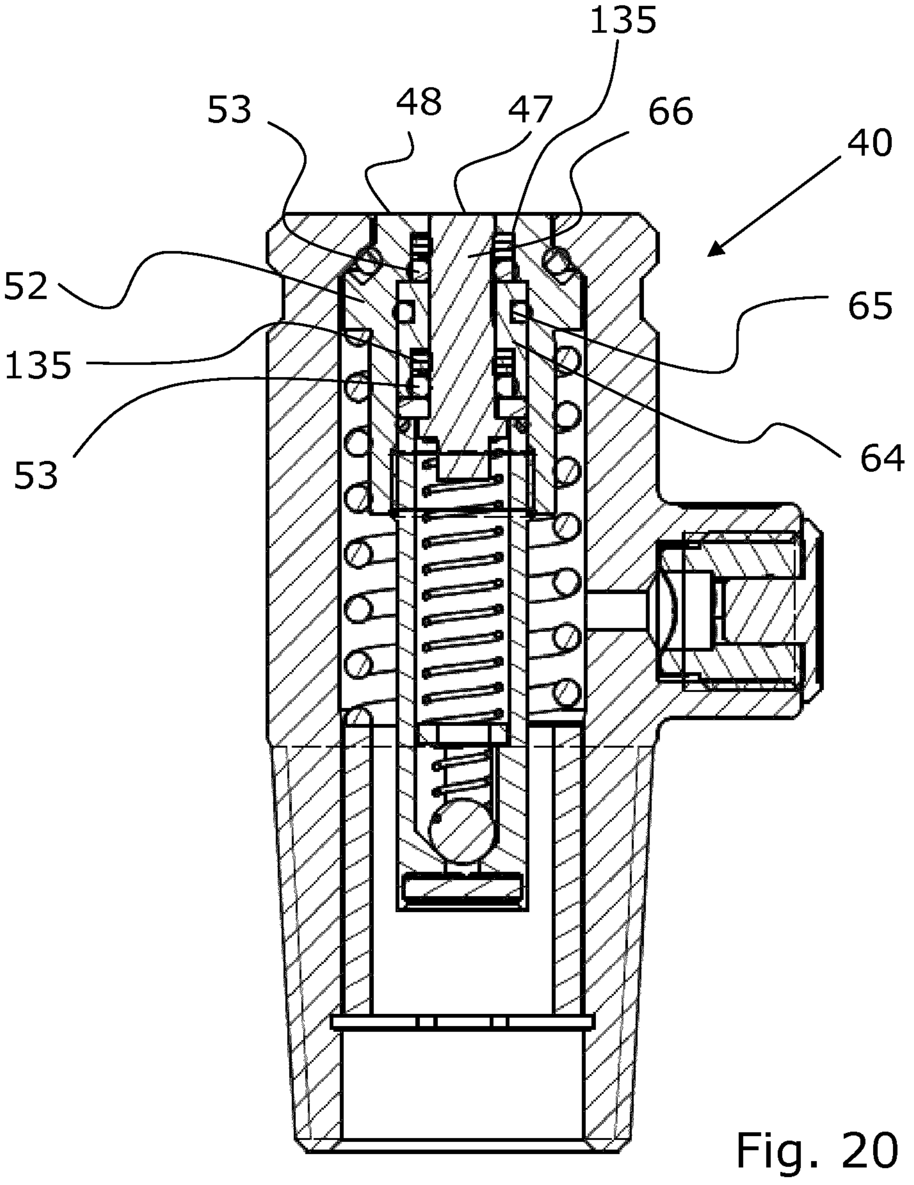
FIG. 20 shows yet another embodiment of a consumption valve in a cross-sectional view in a closed position.

FIG. 20 shows yet another embodiment of a consumption valve 40 in a cross-sectional view in a closed position of the valve. The consumption valve 40 has substantially the same design as that shown in FIGS. 17-19 and is also a double valve having the internal gas valve 47 and the external gas filling valve 48 arranged concentrically around the internal gas valve 47. In this embodiment, a member 66 is displaceable with the valve part 52 and the inner sleeve 64. The upper sealings 53 are arranged in the valve part 52 and the lower sealings 53 are arranged in the inner sleeve 64 facing the outer face of the member 66. Backup rings 135 are arranged above the sealings 53 for supporting the sealings so that they are maintained in position and do not lose their sealing properties. A sealing 65 is arranged between the inner sleeve and valve part 52. On the exterior surface of the member 66, grooves may be arranged in the axial direction of the member 66 for providing flow channels for the gas. The ball 57 has the same function as a residual pressure mechanism as described above.

Figure 21:
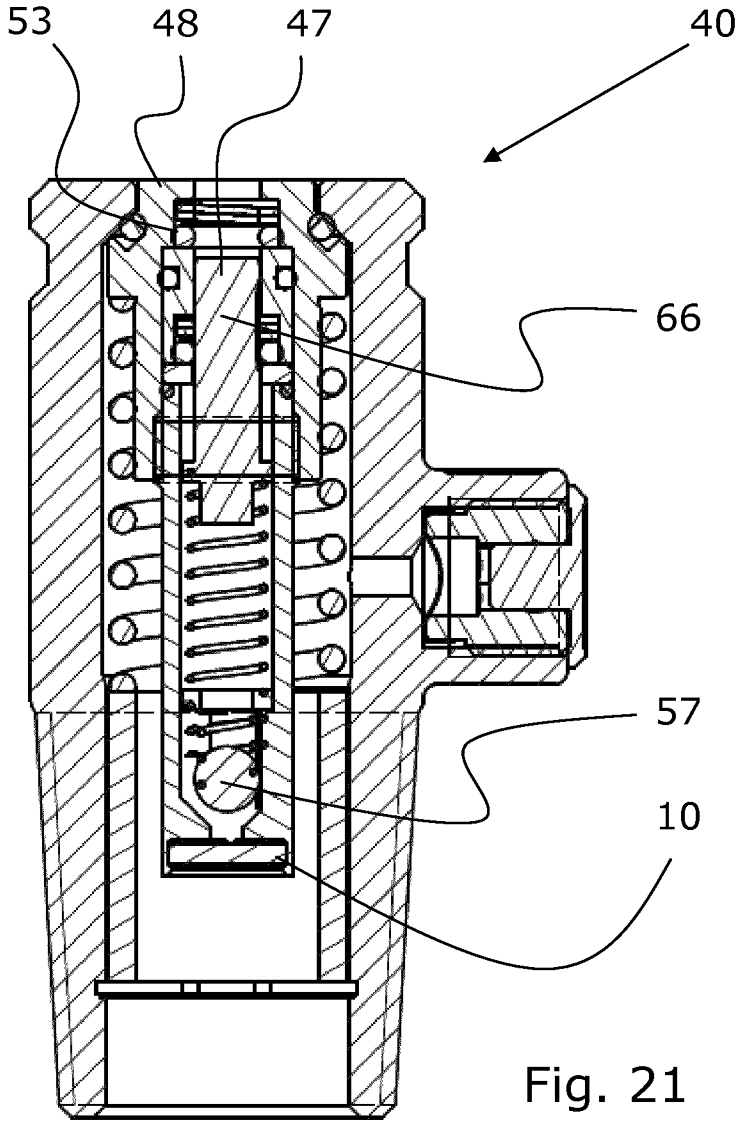
FIG. 21 shows the consumption valve of FIG. 20 in a cross-sectional view in an open position for consumption of a gas.

In FIG. 21, the consumption valve 40 of FIG. 20 is shown in a cross-sectional view in an open position for consumption of a gas through the internal gas valve 47. In this embodiment, the internal gas valve 47 has been displaced downwards by means of an external pressure body (not shown), which is connected to a pressure reduction valve (not shown). As it appears, the member 66 has been moved downwards and past the upper sealing 53, so that the gas present in the gas cylinder may flow via the filter 10 past the ball 57 and up past the member 66, and from there into the pressure reduction valve (not shown). The external gas filling valve 48 is still closed.

Figure 22:
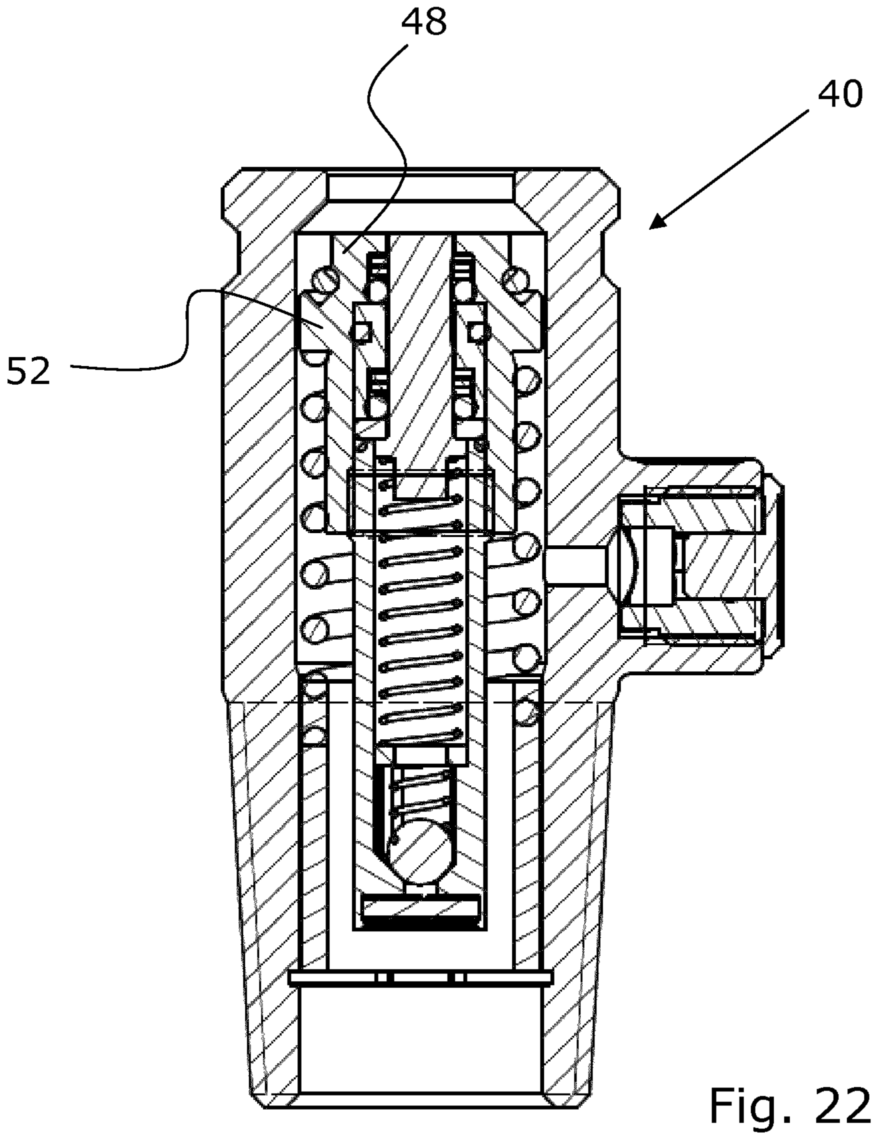
FIG. 22 shows the consumption valve of FIG. 20 in a cross-sectional view in an open position for filling the gas cylinder with gas.

In FIG. 22, the consumption valve 40 of FIG. 20 is shown in a cross-sectional view in an open position for filling the gas cylinder (not shown) with gas. Here the external gas filling valve 48 is open since the valve part 52 has been displaced downwards by a filling unit (not shown) adapted to be connected with the valve 40.

Figure 23:
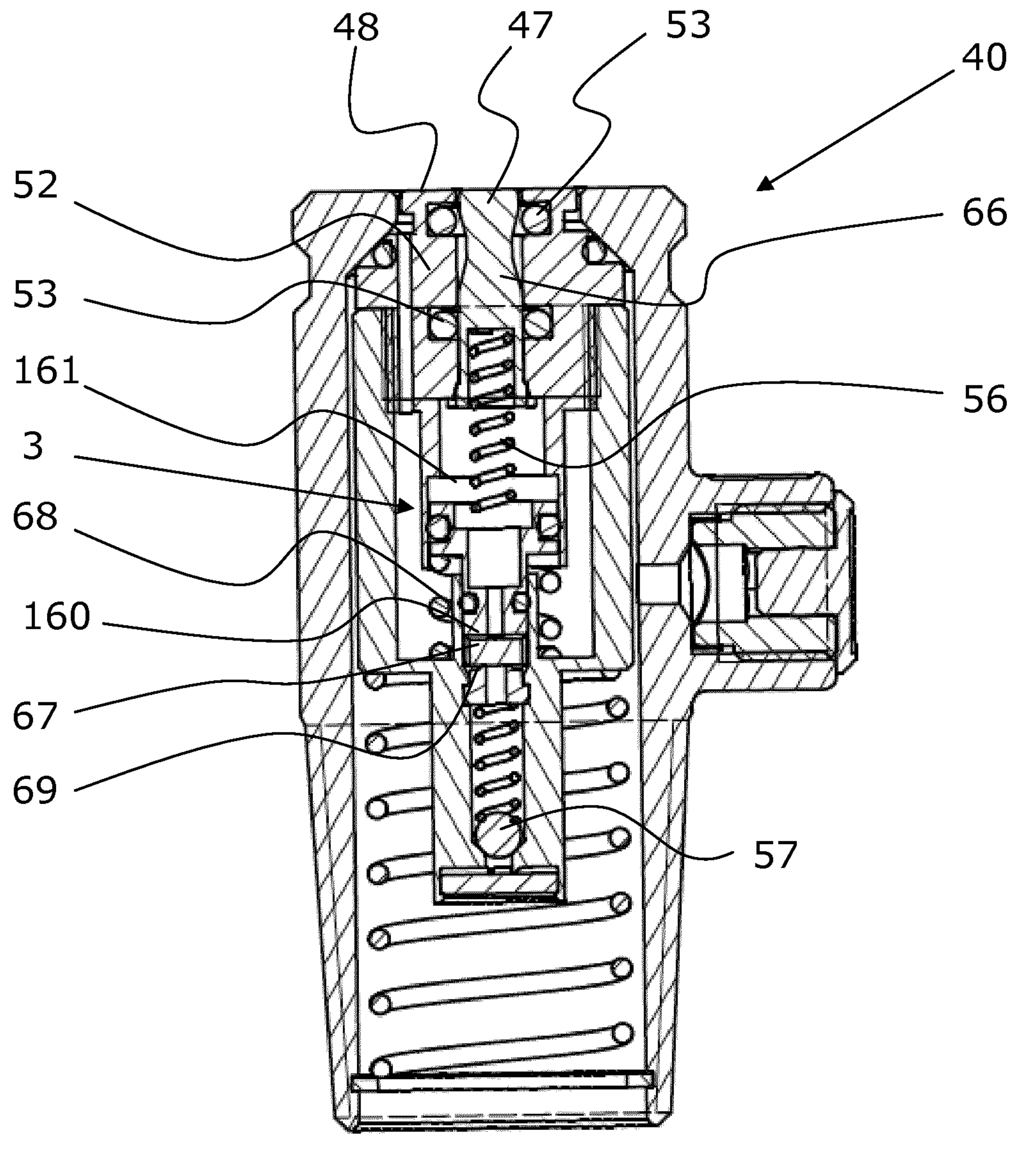
FIG. 23 shows an embodiment of a consumption valve comprising a pressure reduction valve in a cross-sectional view in a closed position.

In FIG. 23 an embodiment of a consumption valve 40 comprising a pressure reduction valve 3 is shown in a cross-sectional view in a closed position of the valve.

In this embodiment, the consumption valve 40 is also a double valve having the internal gas valve 47 and the external gas filling valve 48 arranged concentrically around the internal gas valve 47. In this embodiment, a member 66 is displaceable within a bore in the valve part 52. The upper and lower sealings 53 are arranged in the valve part 52. The member 66 is tailored in its design whereby it has a larger radial extension at the ends than in the middle part of the member 66. The ball 57 has the same function as a residual pressure mechanism as described above.

The consumption valve 40 also comprises a pressure reduction valve 3 adapted to reduce the pressure of the gas present in gas cylinder from a first gas pressure to a second gas pressure. The pressure reduction valve 3 comprises a restricting element 67 which is axially displaceable in a bore. In the situation shown in FIG. 23, the restricting element 67 abuts the surface 69 which function as a valve seat. A helical spring 68 is arranged outside the helical spring 56 connected with the member 66, and the spring 68 assists in the regulation of the pressure through the pressure reduction valve 3. The reduction of pressure is provided by a first area 160 arranged upstream a second area 161, the first area being smaller than the second area 161 seen in the flow direction of the gas. The first and second areas 160, 161 are the cross-sectional areas in the flow direction of the gas.

Figure 24:
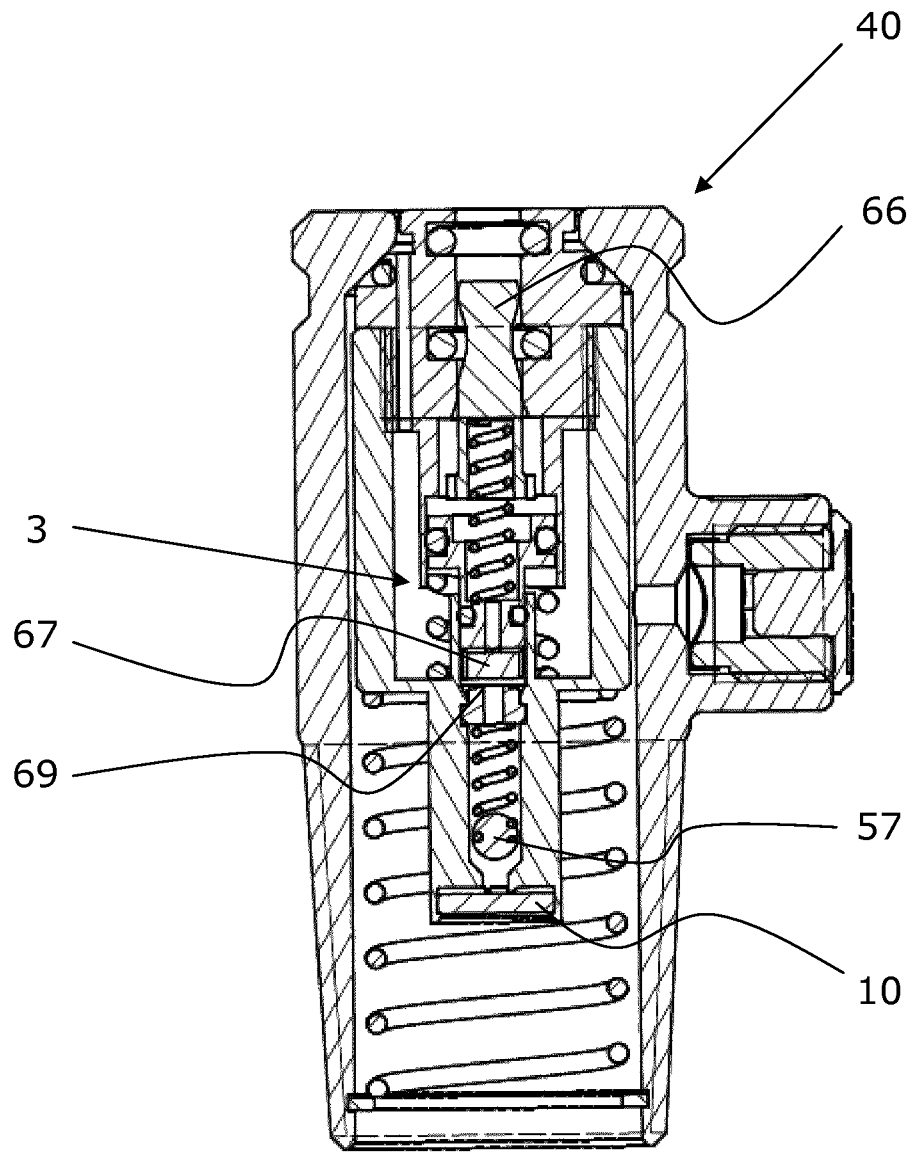
FIG. 24 shows the consumption valve of FIG. 23 in a cross-sectional view in an open position for consumption of a gas.

In FIG. 24, the consumption valve 40 of FIG. 23 is shown in a cross-sectional view in an open position for consumption of a gas through the internal gas valve 47.

In this embodiment, the internal gas valve 47 has been displaced downwards by means of an external pressure body (not shown). As it appears, the member 66 has been moved downwards and past the upper sealing 53, so that the gas present in the gas cylinder having a first gas pressure may flow via the filter 10 past the ball 57 up to the reduction valve 3. In the reduction valve 3, the restricting element 67 has been displaced slightly upwards so that a gap exists between the surface 69 and the restricting element 67, whereby the gas may flow though this gap, and the first gas pressure is reduced accordingly to a second gas pressure. The gas with the second gas pressure then flows up and past the member 66 on its outside, and from there further into the consumer system (not shown). The external gas filling valve 48 is still closed.

Figure 25:
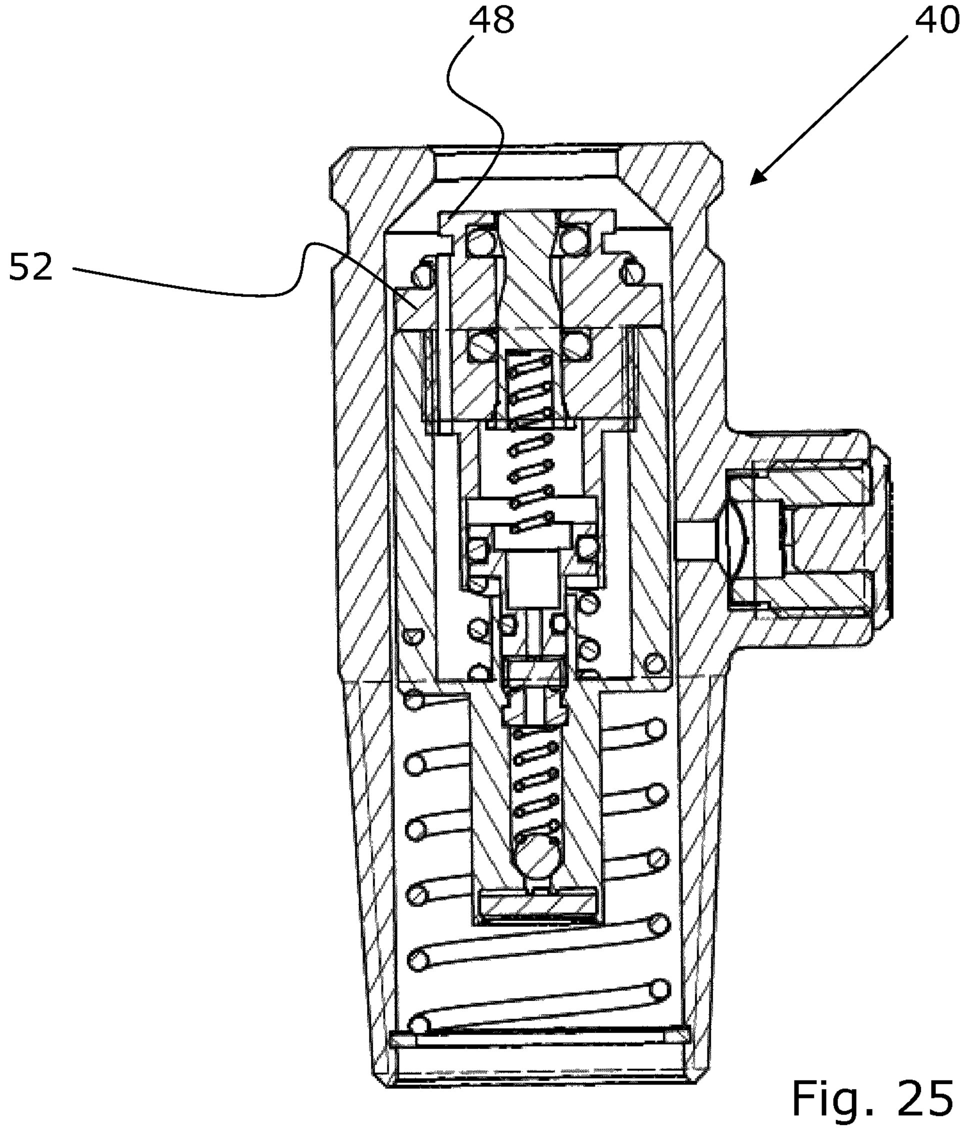
FIG. 25 shows the consumption valve of FIG. 23 in a cross-sectional view in an open position for filling the gas cylinder with gas.

In FIG. 25, the consumption valve 40 of FIG. 23 is shown in a cross-sectional view in an open position for filling the gas cylinder (not shown) with gas having a first pressure. Here the external gas filling valve 48 is open since the valve part 52 has been displaced downwards by a filling unit (not shown) adapted to be connected with the valve 40.

Figure 26:
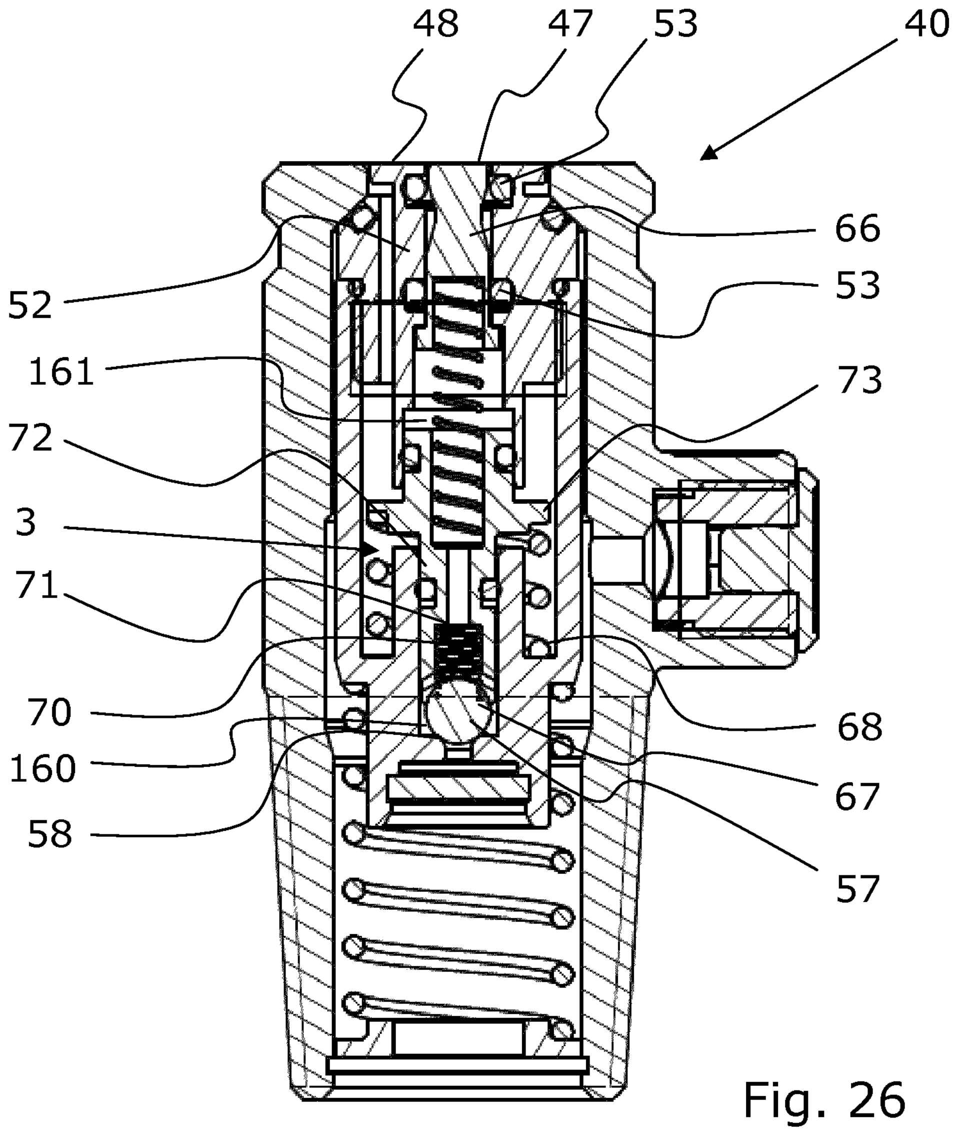
FIG. 26 shows another embodiment of a consumption valve comprising a pressure reduction valve in a cross-sectional view in a closed position.

In FIG. 26, another embodiment of a consumption valve 40 comprising a pressure reduction valve 3 is shown in a cross-sectional view in a closed position of the valve. In this embodiment, the consumption valve 40 is also a double valve having the internal gas valve 47 and the external gas filling valve 48 arranged concentrically around the internal gas valve 47.

In this embodiment, a member 66 is displaceable within a bore in the valve part 52. The upper and lower sealings 53 are arranged in the valve part 52. The member 66 is tailored in its design whereby it has a larger radial extension at the ends than in the middle part of the member 66.

The consumption valve 40 also comprises a pressure reduction valve 3 adapted to reduce the pressure of the gas present in gas cylinder from a first gas pressure to a second gas pressure. The pressure reduction valve 3 comprises a restricting element 67, here in the form of the ball 57. In the situation shown in FIG. 26, the restricting element 67, i.e. the ball 57, abuts the ball seat 58. A helical spring 70 is arranged between the ball 57 and a surface 71 of a valve body 72. A further helical spring 68 is arranged outside the valve body 72 and abuts a projection 73 of the valve body at its upper end. At its lower end the spring 68 abuts a part of the valve part 52. The reduction of pressure is provided by a first area 160 arranged upstream a second area 161, the first area being smaller than the second area 161 seen in the flow direction of the gas. The first and second areas 160, 161 are the cross-sectional areas in the flow direction of the gas.

The ball 57 also has the same function as a residual pressure mechanism as described above.

Figure 27:
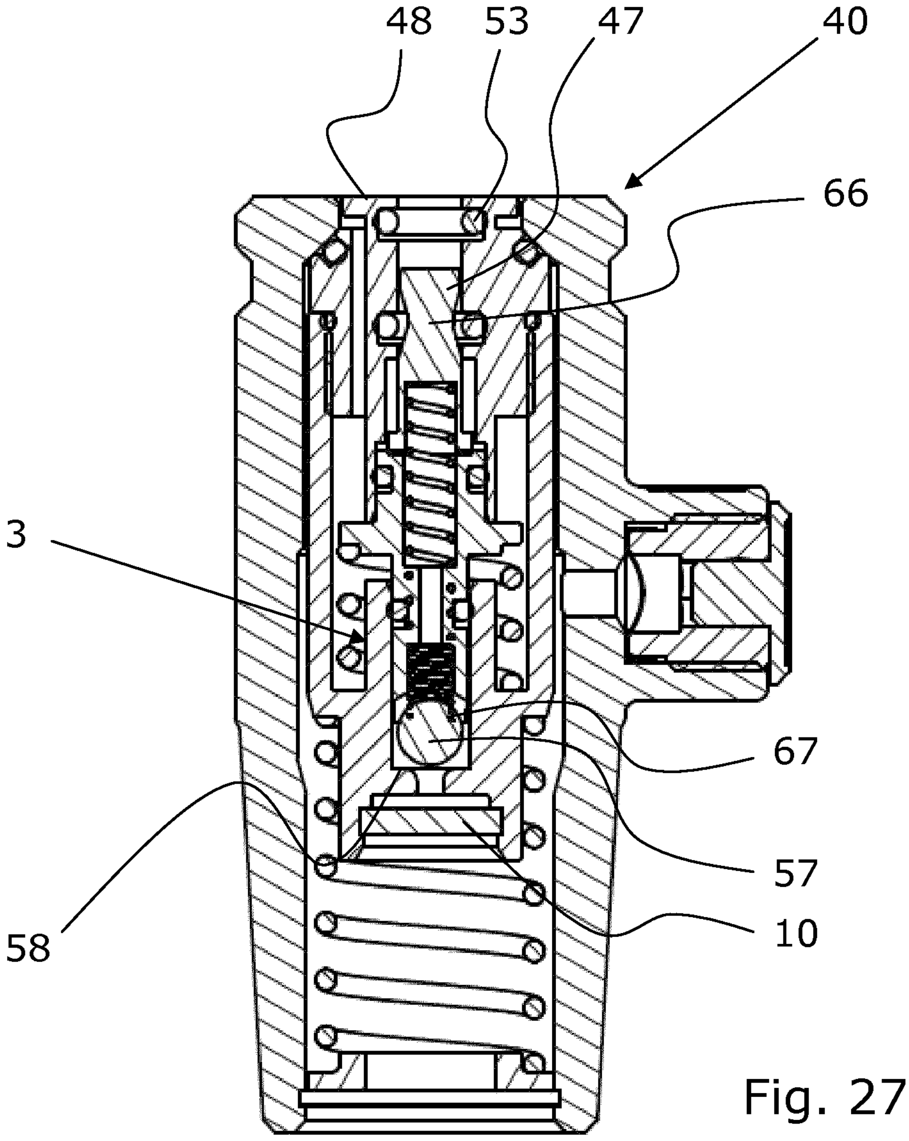
FIG. 27 shows the consumption valve of FIG. 26 in a cross-sectional view in an open position for consumption of a gas.

In FIG. 27, the consumption valve 40 of FIG. 26 is shown in a cross-sectional view in an open position for consumption of a gas through the internal gas valve 47. In this embodiment, the internal gas valve 47 has been displaced downwards by means of an external pressure body (not shown). As it appears, the member 66 has been moved downwards and past the upper sealing 53 so that the gas present in the gas cylinder having a first gas pressure may flow via the filter 10 up to the reduction valve 3. In the reduction valve 3, the restricting element 67, i.e. the ball 57, has been displaced slightly upwards so that a gap exists between the ball seat 58 and the restricting element 67, whereby the gas may flow though this gap, and the first gas pressure is reduced accordingly to a second gas pressure. The gas with the second gas pressure then flows up and past the member 66 on its outside, and from there further into the consumer system (not shown). The external gas filling valve 48 is still closed.

Figure 28:
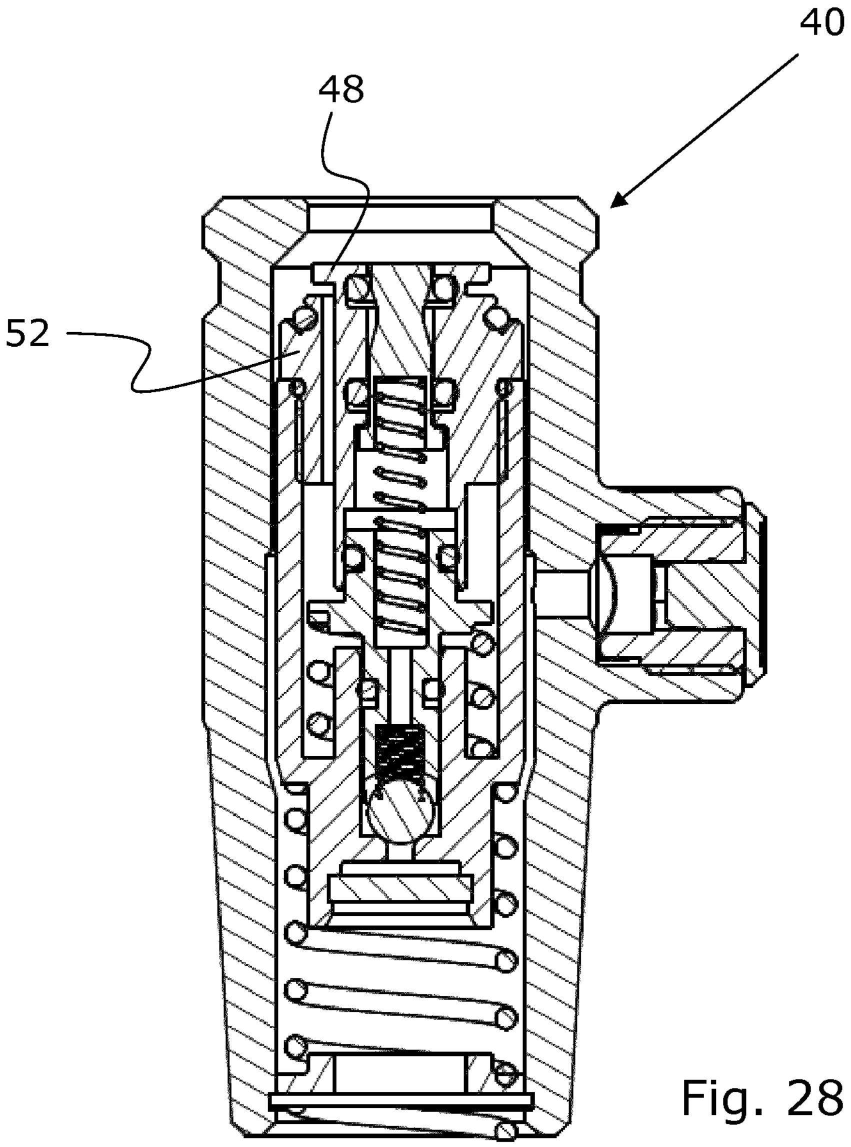
FIG. 28 shows the consumption valve of FIG. 26 in a cross-sectional view in an open position for filling the gas cylinder with gas.

In FIG. 28, the consumption valve 40 of FIG. 26 is shown in a cross-sectional view in an open position for filling the gas cylinder (not shown) with gas having a first pressure. Here the external gas filling valve 48 is open, since the valve part 52 has been displaced downwards by a filling unit (not shown) adapted to be connected with the valve 40.

Figure 29:
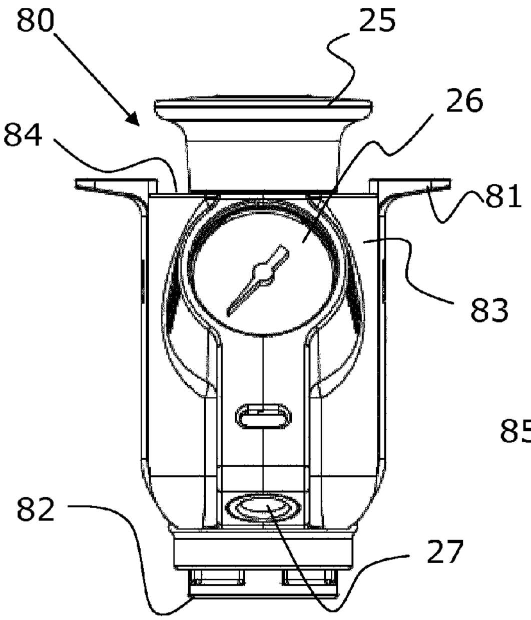
FIGS. 29-31 show a pressure regulator device in different views in a deactivated position.
Figure 30:
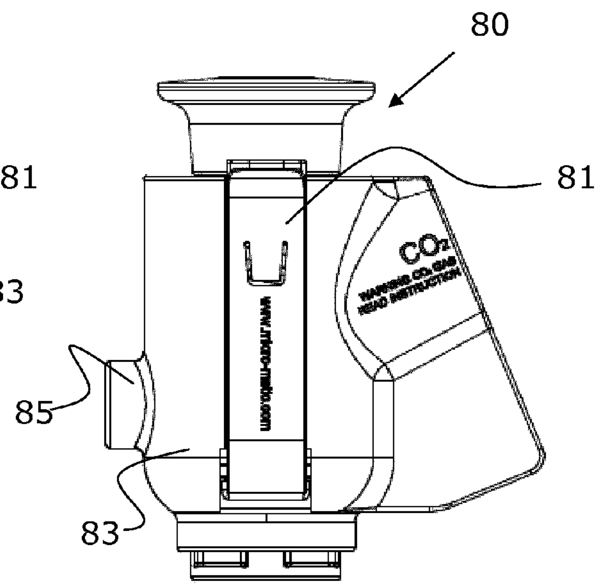
Figure 31:
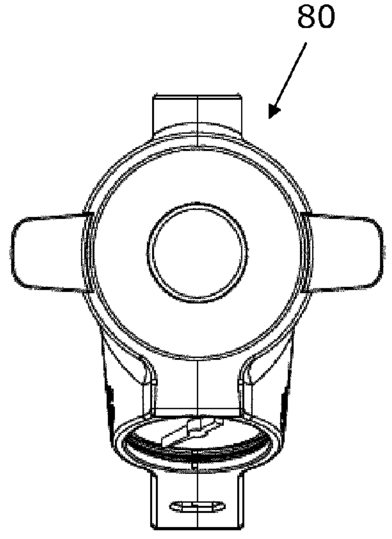

FIGS. 29-31 show a connector, in the following referred to as a pressure regulator device 80, in different views in a deactivated position, i.e. not connected with a valve. FIG. 29 shows the pressure regulator device 80 in a front view. The pressure regulator device 80 comprises a pressure indicator 26, a handle for regulating the pressure for the gas flowing through the pressure regulator device 80 and an outlet 27. The pressure regulator device 80 also comprises a connection handle 81. The connection handle 81 has two flanges projecting out from the housing 83, and extending a bit further up in relation to an upper face 84 of the housing 83. The pressure regulator device 80 is adapted to be connected with a consumption valve, as described above, or an adaptor unit, at a first end 82. FIG. 30 shows the pressure regulator device 80 in a side view. The connection handle 81 extends downwards on the outside of the housing 83. The pressure regulator device 80 also comprises a pressure relief valve 85. FIG. 31 shows the pressure regulator device 80 in a top view.

Figure 32:
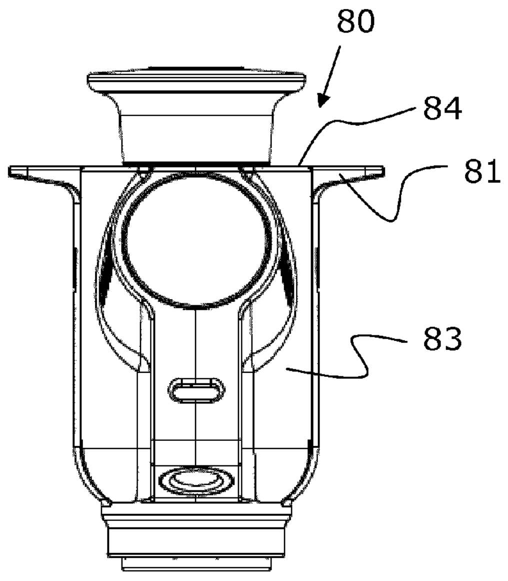
FIG. 32 shows the pressure regulator device of FIGS. 29-31 in an activated position.

In FIG. 32, the pressure regulator device 80 of FIGS. 29-31 is shown in an activated position. In the activated position the connection handle 81 has been moved downwards so that the top of the connection handle 81 is substantially flush with the upper face 84 of the housing 83.

Figure 33:
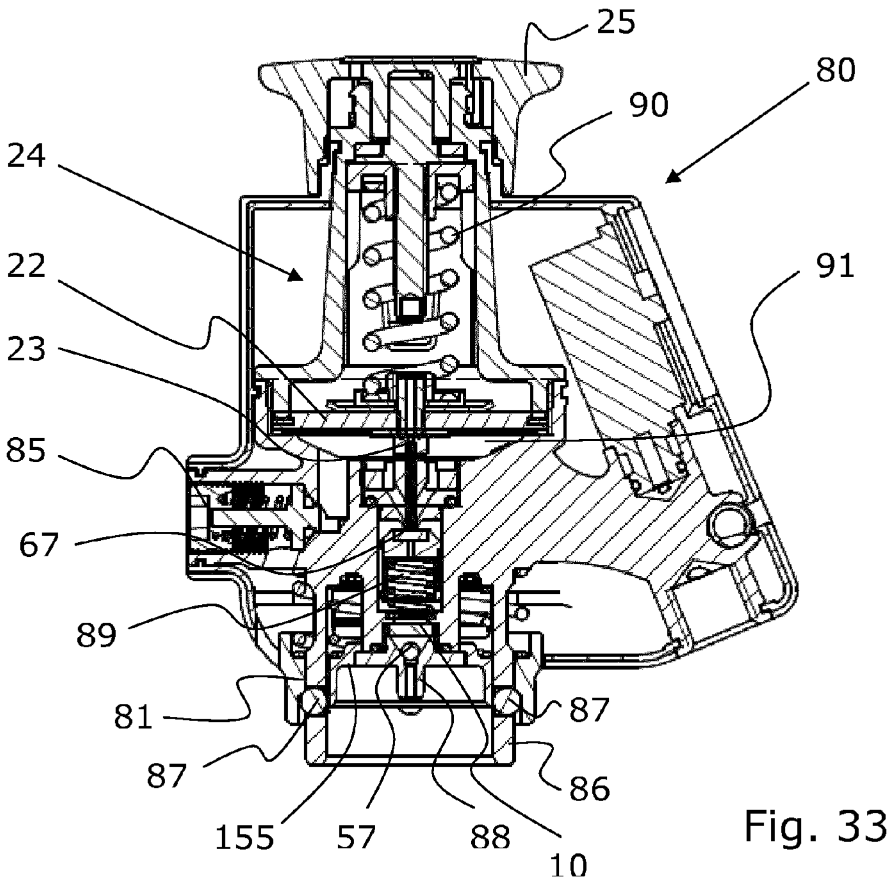
FIG. 33 shows the pressure regulator device of FIGS. 29-31 in a first cross-sectional view.

In FIG. 33, the pressure regulator device 80 of FIGS. 29-31 is shown in a first cross-sectional view in the deactivated position. The first cross-sectional view is taken along the centre line of the pressure regulator device 80. The pressure regulator device 80 is adapted to be connected with the consumption valve described above and comprises a collar 86 adapted to engage the second end of the consumption valve. In a groove in the collar 86, balls 87 are arranged. The balls 87 are adapted to be displaced radially inwards when the connection handle 81 is pressed downwards, so that the balls may engage the groove of the consumption valve, whereby a mechanical locking between the consumption valve and the pressure regulator device 80 is obtained. Furthermore, the pressure regulator device also comprises a spring-loaded inner ring 155, which is adapted to maintain the balls 87 within the grooves in a not-engaging position, in the deactivated position.

The pressure regulator device 80 furthermore comprises an external pressure body 88 adapted to be displaced downwards to open the internal gas valve of the consumption valve.

The pressure regulator device 80 also comprises a pressure regulation valve as briefly described in connection with FIG. 8 above. The pressure regulation valve comprises a restricting element 67 and a spring 89 providing a spring force to the restricting element 67. Via a self-venting pin 23, a diaphragm 22 is connected, which in turn is connected with the regulator device 24, here in the form of a spring 90, and the regulator device 24 is connected with the handle 25. As pressure in the upper chamber 91 increases, the diaphragm 22 is pushed upwards, causing the restricting element 67 to reduce flow, which brings the pressure back down. By adjusting the handle 25, the downward pressure on the diaphragm 22 can be increased, requiring more pressure in the upper chamber 91 in order to maintain equilibrium. In this way, the outlet pressure of the pressure regulator device 80 is controlled to the predetermined level.

A non-return valve in the form of a ball 57 is furthermore arranged downstream the external pressure body 88, and a filter 10 is arranged downstream the ball 57. The pressure regulator device 80 also comprises a pressure relief valve 85, which is well-known and which will therefore not be described in detail.

Figure 34:
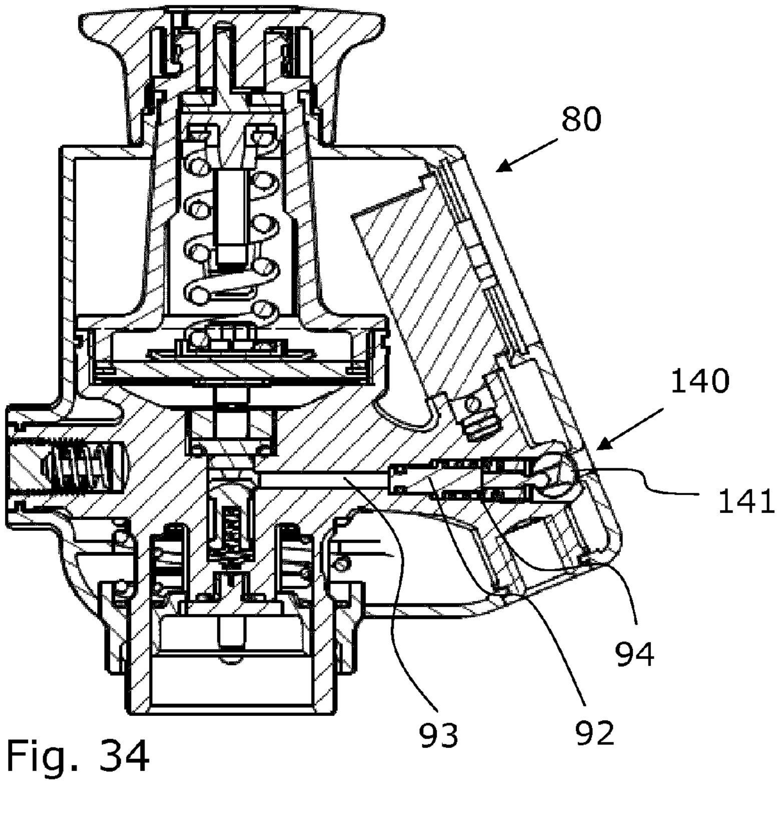
FIG. 34 shows the pressure regulator device of FIGS. 29-31 in a second cross-sectional view.

In FIG. 34, the pressure regulator device 80 of FIGS. 29-31 is shown in a second cross-sectional view at the pressure indicator. The pressure indicator 140 is arranged in connection with the pressure reduction valve. The pressure indicator 140 comprises a reading scale 141 and a piston 92 which counterbalances the pressure of the gas flowing in bore 93 by a spring 94. The inlet to the bore 93 is positioned after the restricting element 67. The piston 92 is adapted to change the reading scale 141 for instance from one colour to another. These colours could be red and green, respectively.

Figure 35:
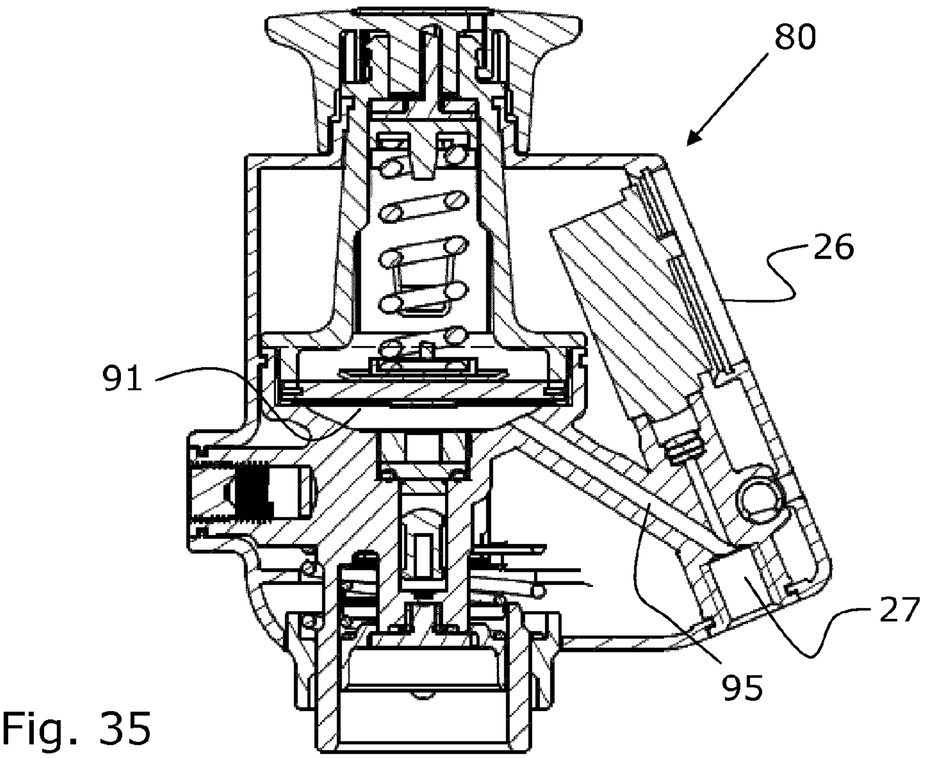
FIG. 35 shows the pressure regulator device of FIGS. 29-31 in a third cross-sectional view.

In FIG. 35, the pressure regulator device 80 of FIGS. 29-31 is shown in a third cross-sectional view taken at the outlet 27. The outlet 27 is connected to the upper chamber 91 via a bore 95. Furthermore, an additional pressure indicator 26 in the form of a manometer is arranged in connection with the outlet 27 so that the gas pressure leaving the outlet 27 may be read on the manometer.

Figure 36:
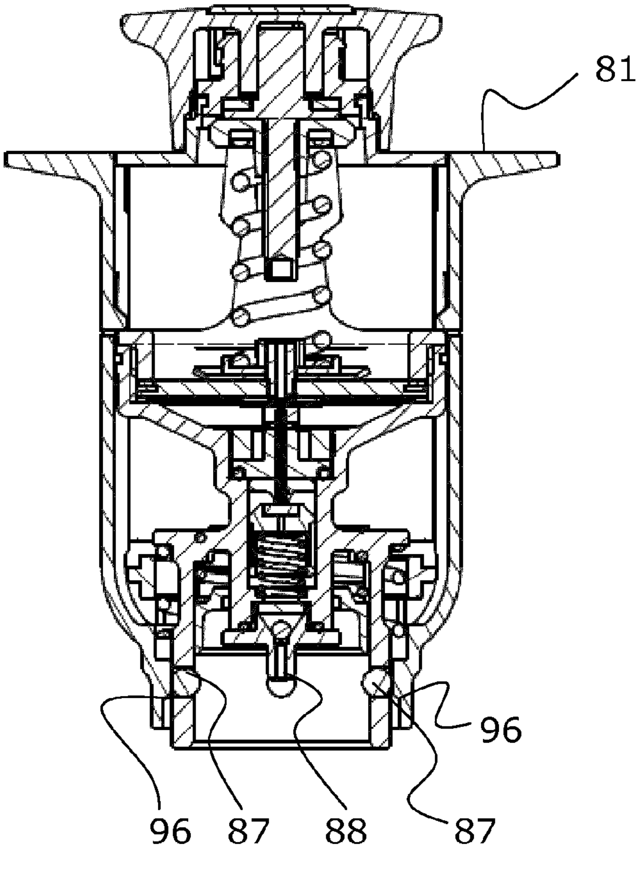
FIG. 36 shows the pressure regulator device of FIG. 32 in a first cross-sectional view.
Figure 37:
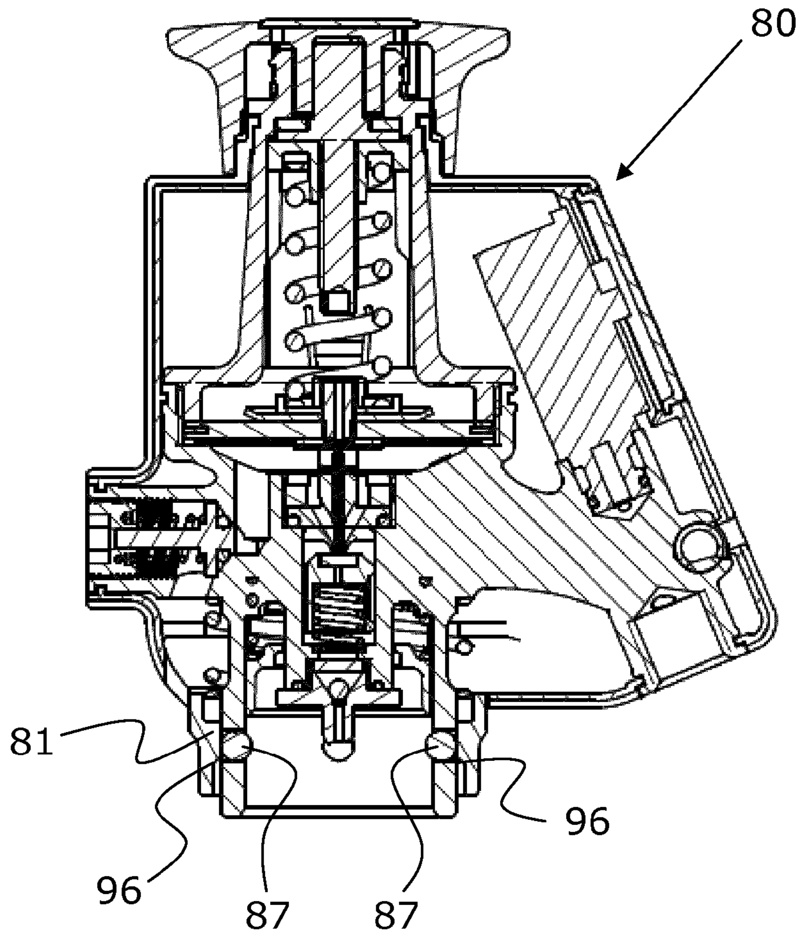
FIG. 37 shows the pressure regulator device of FIG. 32 in a second cross-sectional view.

In FIG. 36, the pressure regulator device 80 of FIG. 32 is in a first cross-sectional view wherein the pressure regulator device 80 is activated by the connection handle 81 being pressed downwards. When the connection handle 81 is displaced downwards, a projection 96 ensures that the balls 87 are displaced radially inwards, as shown in FIG. 35, and that they are maintained in these positions as long as the connection handle 81 is in its lowermost position. Hereby the pressure regulator device 80 is securely connected with a consumption valve as described above since the balls 87 project and engage the groove of the second end of the consumption valve. The external pressure body 88 has also been activated and displaced downwards for opening the internal gas valve. FIG. 37 shows the pressure regulator device 80 of FIG. 32 in a second cross-sectional view taken along the centre line of the pressure regulator device 80, and also discloses that the balls 87 have been displaced radially inwards by the projection 96 of the connection handle 81.

Figure 38:
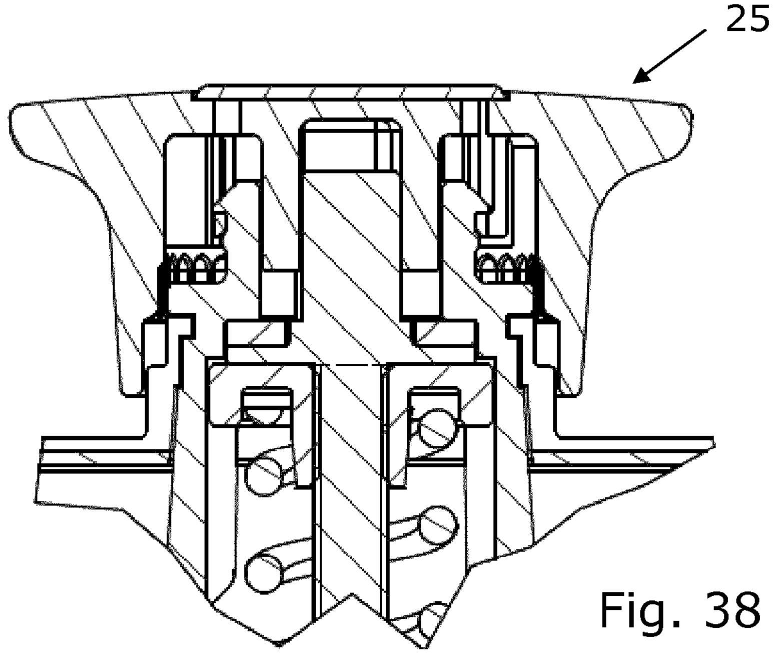
FIG. 38 shows an enlarged cross-sectional view of a handle of the pressure regulator device.
Figure 39:
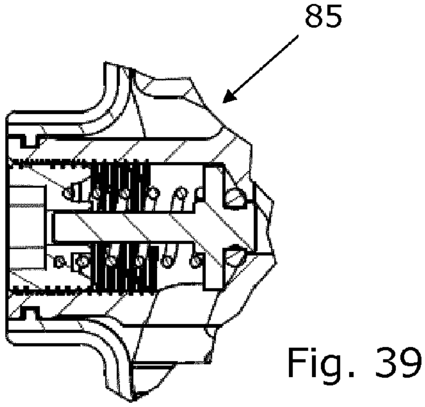
FIG. 39 shows an enlarged cross-sectional view of a pressure relief valve of the pressure regulator device.

FIG. 38 shows an enlarged cross-sectional view of the handle 25 of the pressure regulator device 80. In the shown position, the handle 25 is locked so that no pressure regulation may occur. When pressure regulation is desired, the handle 25 is lifted in relation to the position shown in FIG. 38 and it may thereby be activated. FIG. 39 shows an enlarged cross-sectional view of the pressure relief valve 85 of the pressure regulator device 80.

Figure 40:
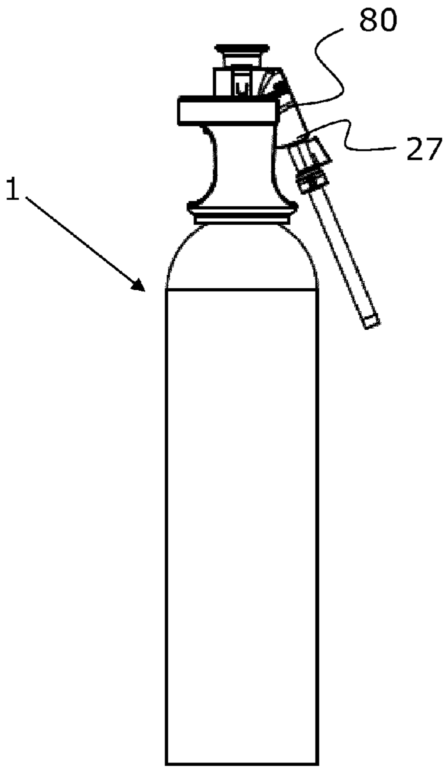
FIG. 40 shows a gas cylinder with a consumption valve having a pressure regulator device connected therewith in a side view in a deactivated position of the pressure regulator device.
Figure 41:
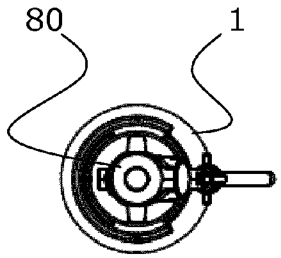
FIG. 41 shows the gas cylinder of FIG. 40 in a top view.
Figure 42:
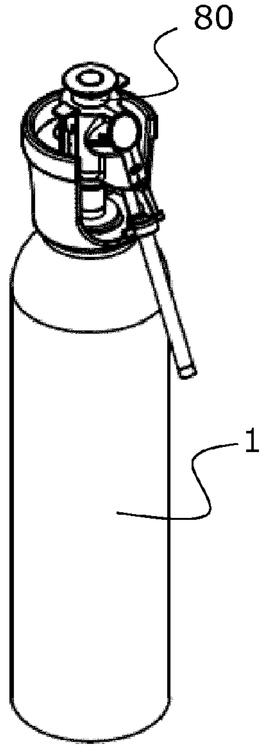
FIG. 42 shows the gas cylinder of FIG. 40 in a perspective view.
Figure 43:
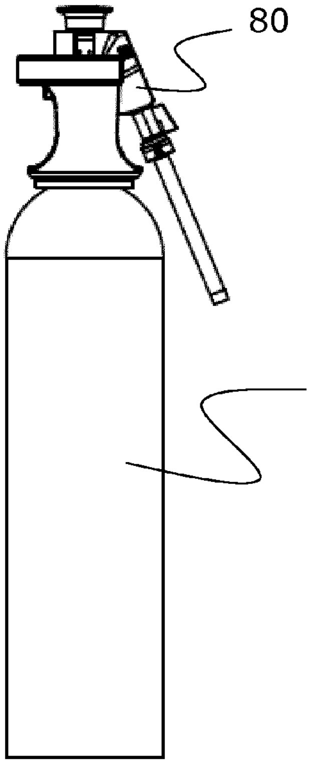
FIG. 43 shows the gas cylinder of FIG. 40 in a side view wherein the pressure regulator device has been activated.

In FIG. 40, a gas cylinder 1 with a consumption valve (not shown) having a pressure regulator device 80 connected therewith is shown in a side view in a deactivated position of the pressure regulator device 80. In the outlet 27 of the pressure regulator device 80, a gas line 97 is arranged, which in turn is connected with a consumer system (not shown). FIG. 41 shows the gas cylinder 1 of FIG. 40 in a top view having the pressure regulator device 80 arranged at the top. FIG. 42 shows the gas cylinder 1 of FIG. 40 in a perspective view. The pressure regulator device 80 is connected with the consumption valve (not shown) arranged in the outlet of the gas cylinder 1. In this embodiment, the pressure regulator device 80 is connected in an axial direction of the gas cylinder 1. However, in other embodiments, the pressure regulator device 80 may equally well be connected in a radial direction in relation to the gas cylinder 1. In FIG. 43, the gas cylinder 1 of FIG. 40 is shown in a side view wherein the pressure regulator device 80 has been activated.

Figure 44:
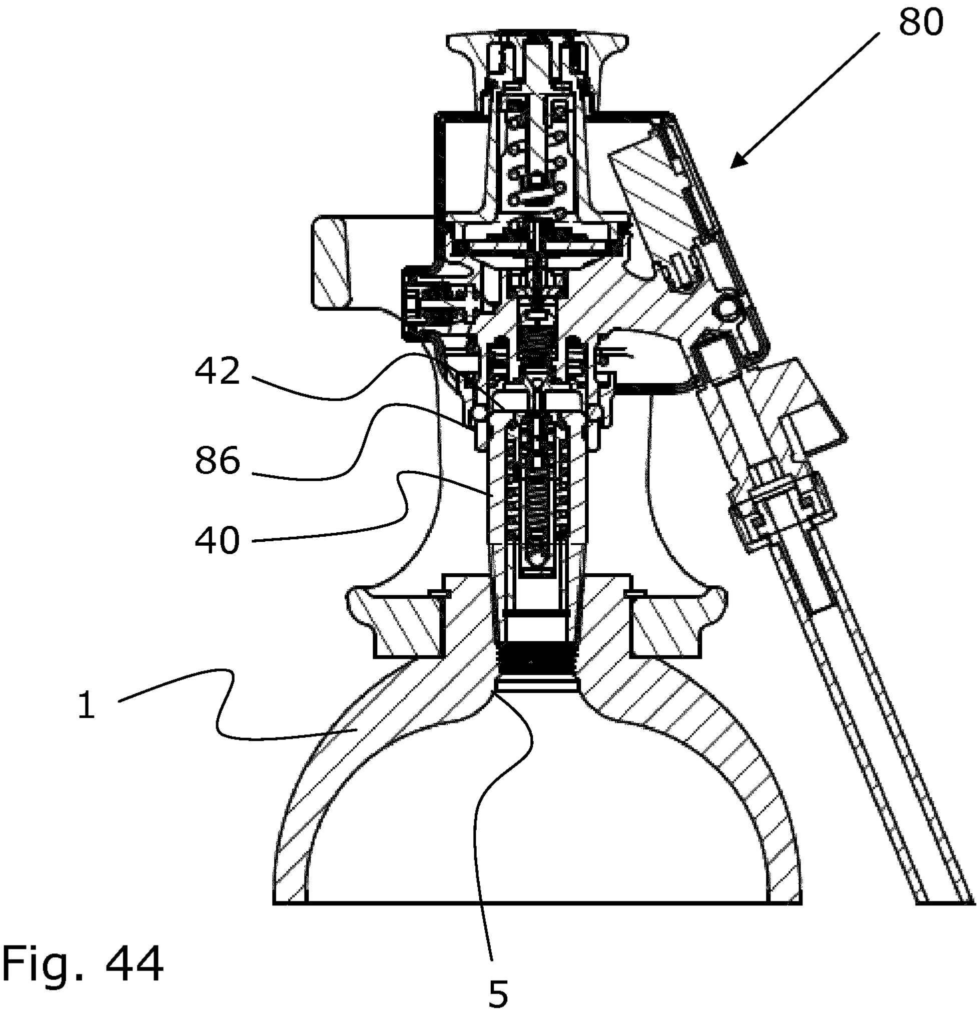
FIG. 44 shows, in a cross-sectional view, the gas cylinder of FIG. 40 in the deactivated position of the pressure regulator device.
Figure 45:
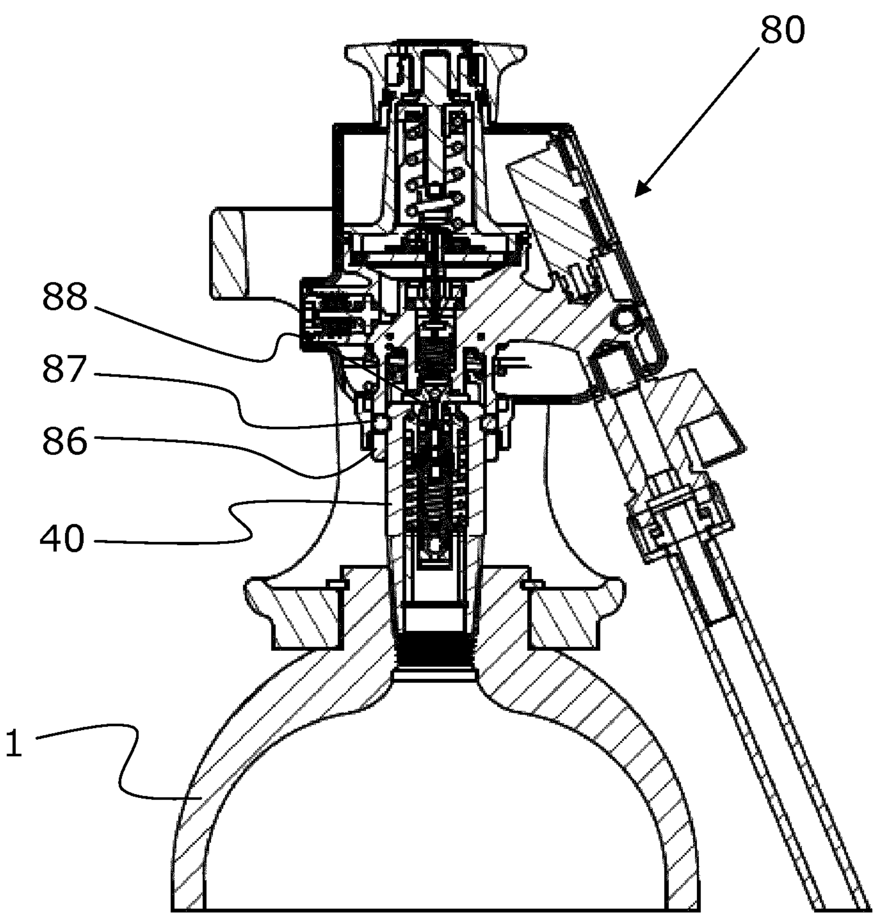
FIG. 45 shows, in a cross-sectional view, the gas cylinder of FIG. 43 in the activated position of the pressure regulator device.
Figure 46:
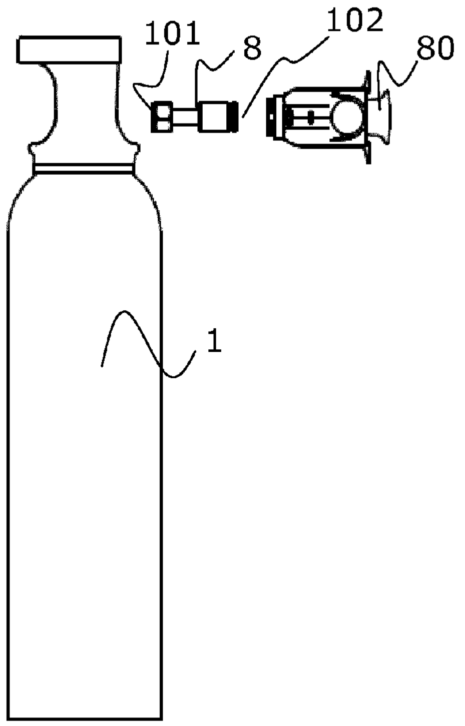
FIGS. 46-52 show a pressure regulator device being connected with a valve of a gas cylinder via an adaptor unit.
Figure 47:
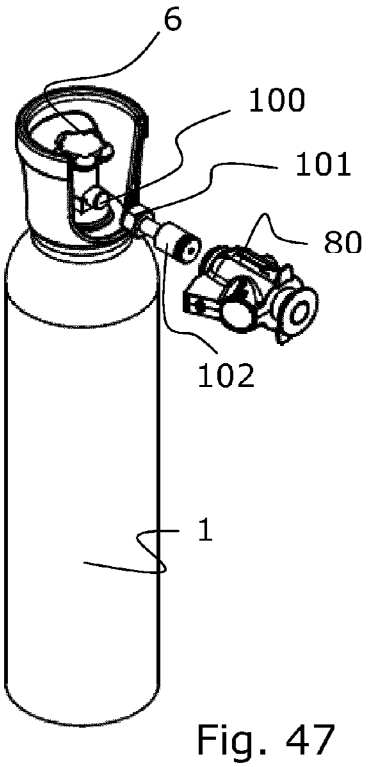
Figure 48:
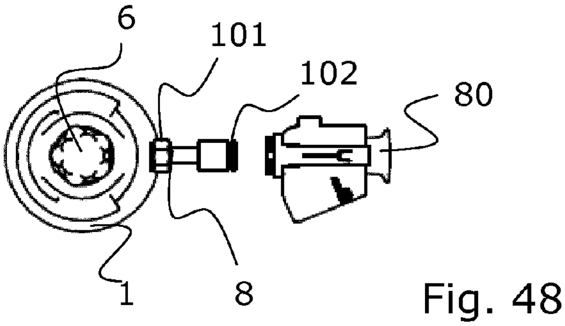
Figure 49:
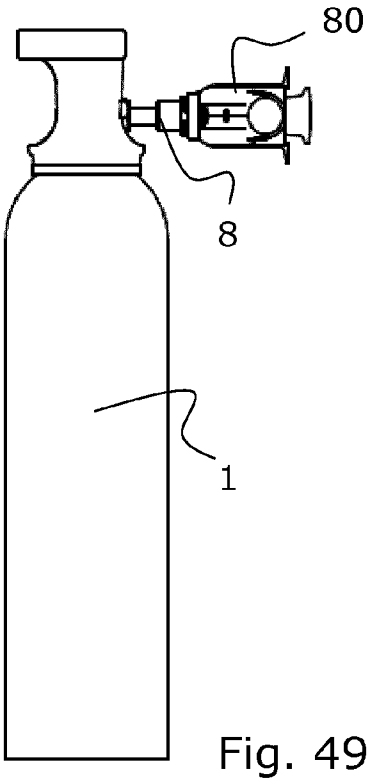
Figure 50:
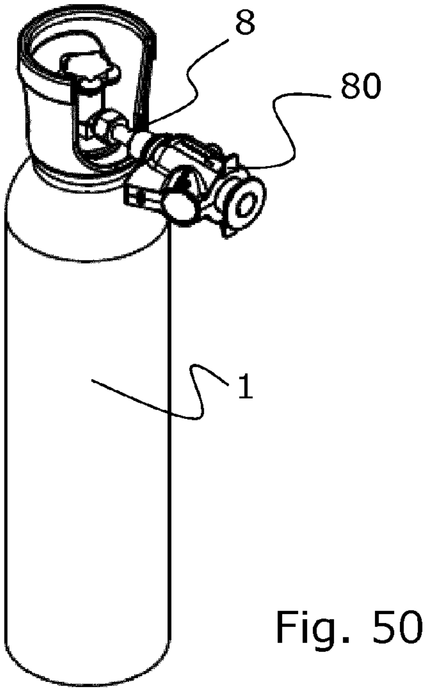
Figure 51:
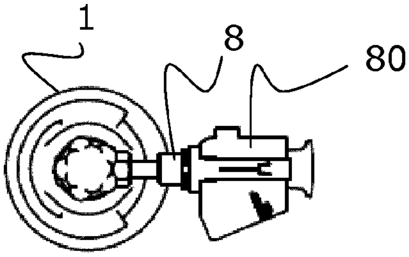
Figure 52:
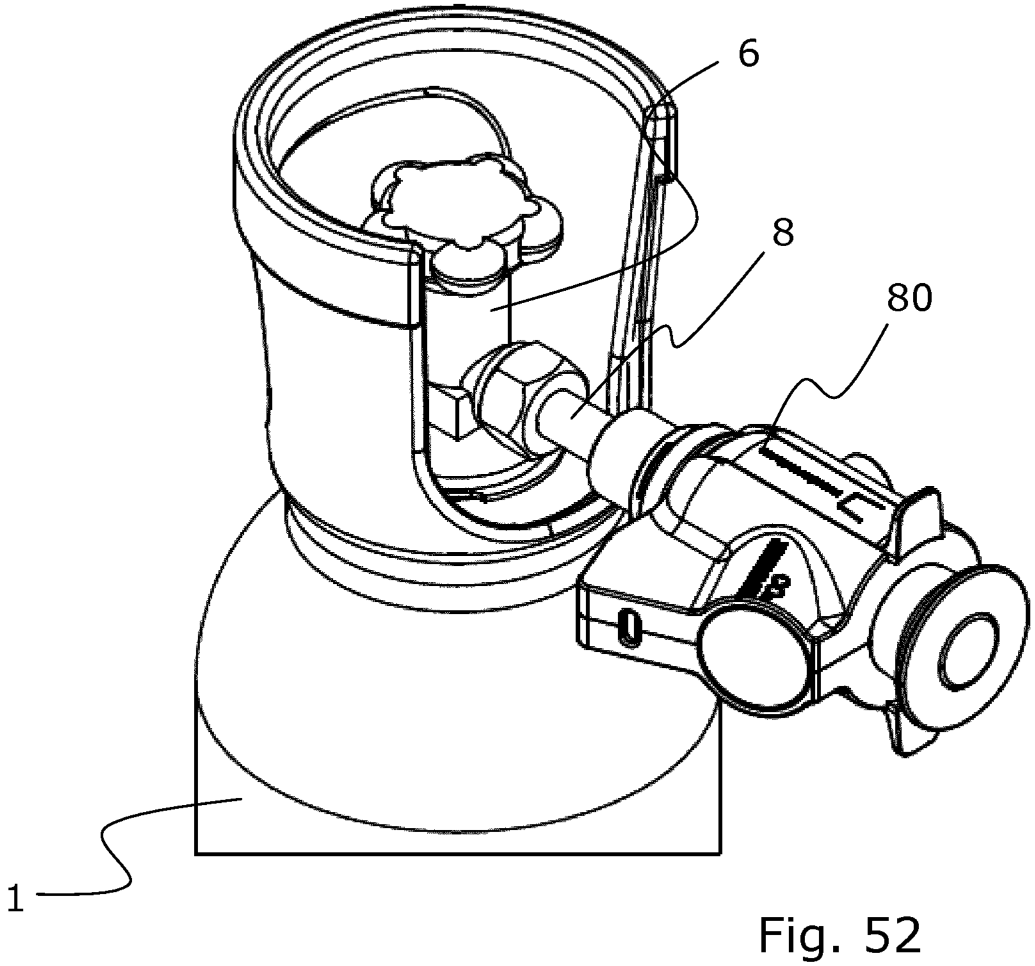
Figures 53, 54:
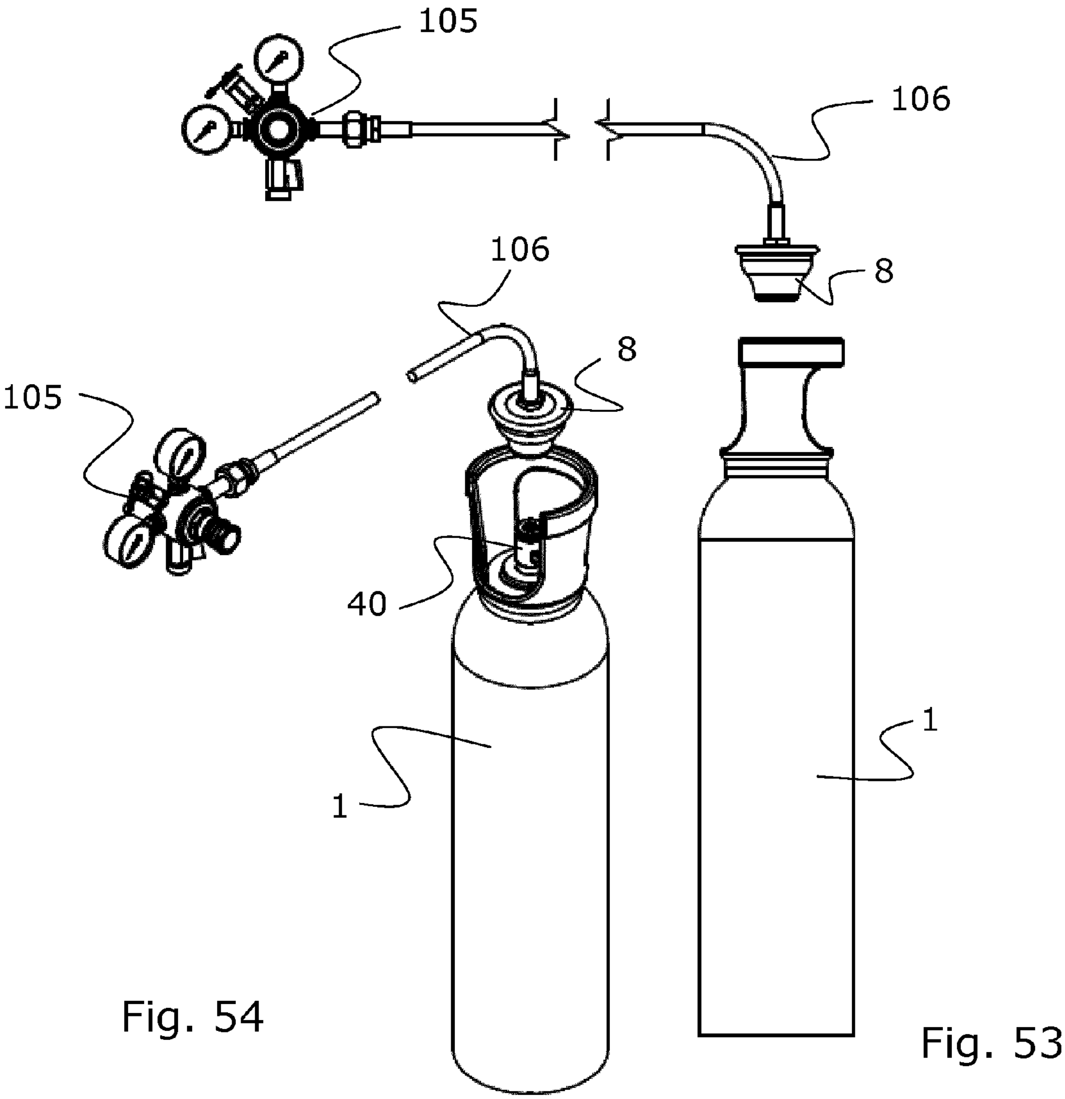
FIGS. 53-57 show a pressure regulator device being connected with a valve of a gas cylinder via an adaptor unit, the pressure regulator device being positioned a distance from the gas cylinder.
Figures 55, 56:
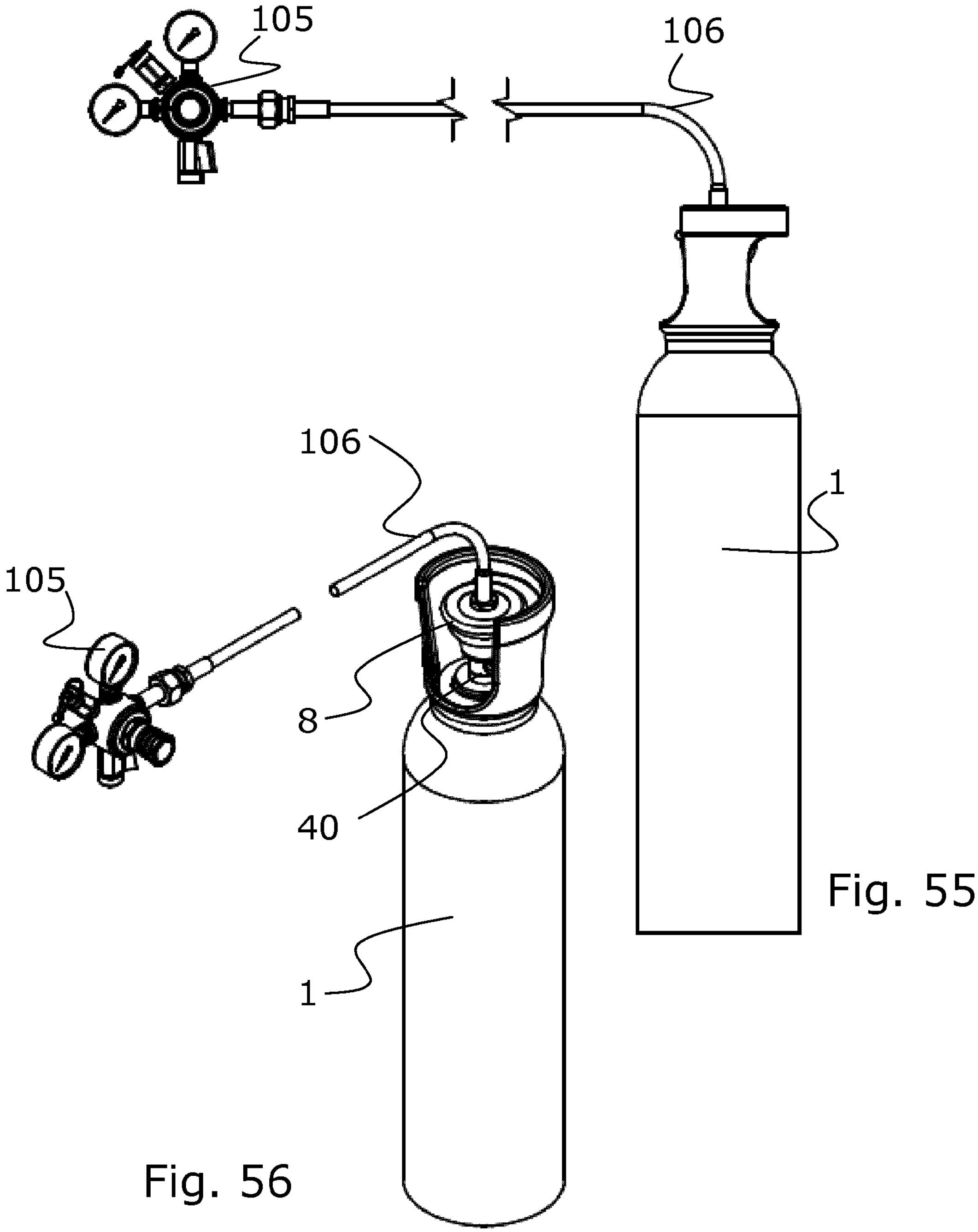

FIG. 44 shows in a cross-sectional view a top part of the gas cylinder 1 of FIG. 40 in the deactivated position of the pressure regulator device 80. Furthermore, the consumption valve 40 is shown screwed into the outlet 5 of the gas cylinder. The collar 86 of the pressure regulator device 80 is not fully pressed down over the second end 42 of the consumption valve 40. In FIG. 45, the pressure regulator device 80 has been displaced further downwards so that the collar fully surrounds the second end 42 of the consumption valve 40. Furthermore, the balls 87 have been displaced radially inward so that they project and engage the groove of the consumption valve 40. The external pressure body 88 has also been displaced axially downwards to displace and open the internal gas valve.

In FIGS. 46-52, a pressure regulator device 80 is shown connected with an on/off valve 6 of a gas cylinder 1 via an adaptor unit 8. In this embodiment, the gas cylinder 1 is a well known gas cylinder having an ordinary on/off valve 6. The outlet of the on/off valve has a threaded connection, which in the shown embodiment is a male thread 100. Thus, when the pressure regulator device 80 is connected with the gas cylinder 1, a female thread 101 of the adaptor unit 8 is first screwed onto the male thread 100 of the on/off valve 6. In the opposite end in relation to the female thread 101, the adaptor unit 8 comprises a connection part 102, substantially having the same configuration as the second end of the consumption valve. Thus, the connection part 102 also has a groove extending around the outside face of the connection part 102. The connection part may equally well comprise a gas valve, so that when the adaptor unit 8 has been screwed on the on/off valve 6, the on/off valve 6 may be opened without the gas flowing out via the adaptor unit 8. When the adaptor unit 8 is connected with the on/off valve 6, the pressure regulator device 80 may be connected with the connection part 102 in the same manner as described above in connection with FIGS. 29-37. In FIGS. 49-52, the pressure regulator device 80 has been connected with the gas cylinder 1 via the adaptor unit 8. By applying the adaptor unit 8 to the known gas cylinders with the known on/off valves, handling of these known gas cylinders is facilitated.

Figure 57:
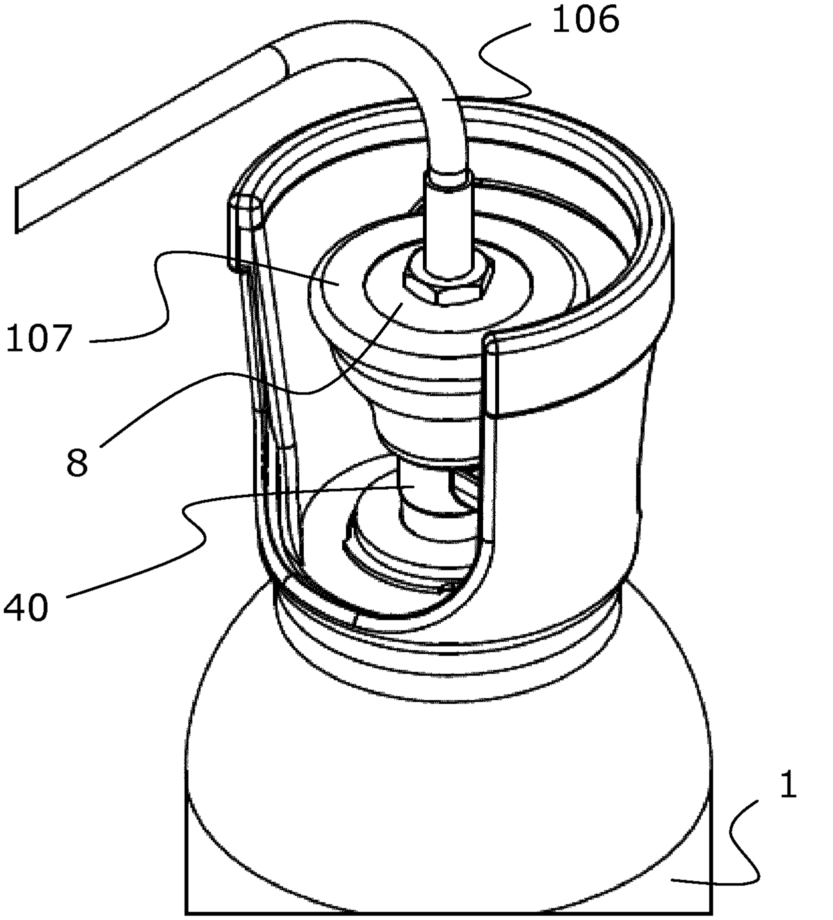

FIGS. 53-57 show a pressure regulator device 105 being connected with a consumption valve 40 of a gas cylinder 1 via another embodiment of an adaptor unit 8, the pressure regulator device 105 positioned a distance from the gas cylinder 1. The adaptor unit 8 comprises a collar substantially having the same design as the collar of the pressure regulator device described above, and the collar of the adaptor unit 8 is, in the same manner, adapted to engage the second end of the consumption valve 40. In the opposite end of the collar, the adaptor unit has an outlet wherein a gas line 106 is connected. The adaptor unit 8 also has a connection handle 107, as shown in FIG. 57, functioning in the same way as the connection handle of the pressure regulator device described above. Thus, the adaptor unit 8 also has the same mechanical locking means, i.e. balls which may be displaced radially inwards into the groove of the second end of the consumption valve 40.

Figure 58:
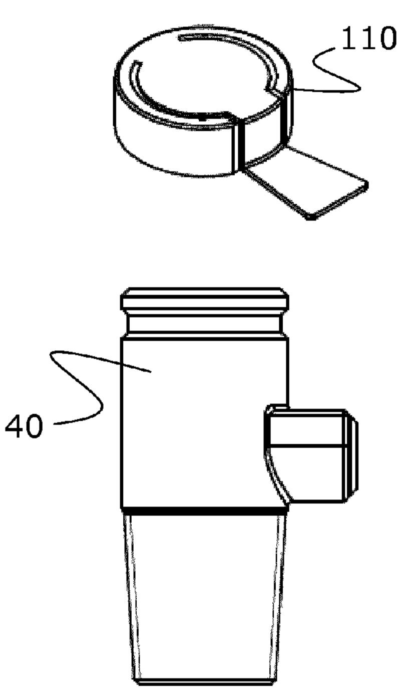
FIG. 58 shows a protective cap to be arranged on the consumption valve to protect the valve during transportation and storage.

In FIG. 58, a protective cap 110 is shown to be arranged on the consumption valve 40 to protect the valve during transportation and storage.

Figure 59:
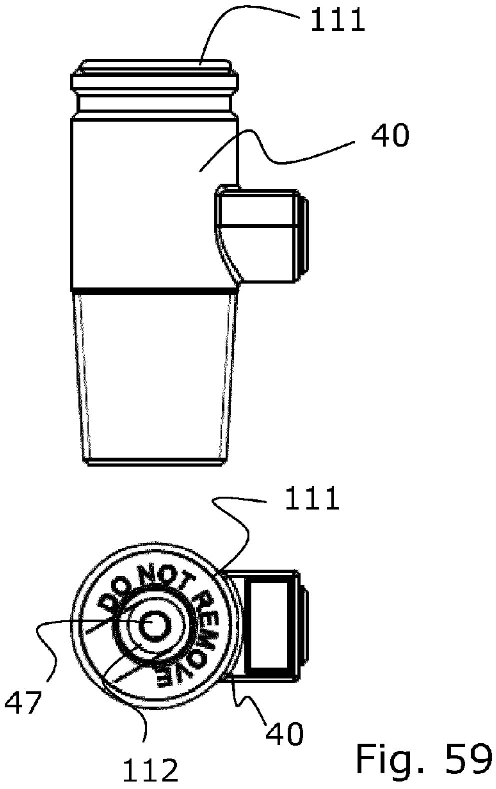
FIG. 59 shows a metal cap adapted to be arranged above the consumption valve.

Furthermore, as shown in FIG. 59, a cap 111 may be adapted to be arranged above the consumption valve 40. Preferably, the cap 111 is made of a rigid material, such as metal, composite or rigid plastic material. The cap 111 has an opening 112 in the centre enabling the external pressure body (not shown) to project through the opening 112 and displace the internal gas valve 47. Furthermore, the cap 111 is adapted to prevent unintended activation and opening of the external gas filling valve.

Figure 60:
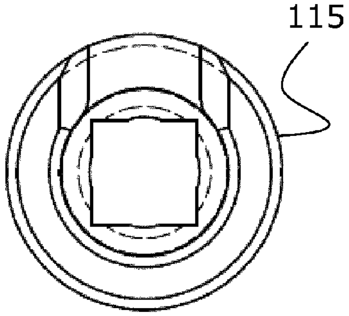
FIGS. 60-61 show a tool adapted to connecting and disconnecting a consumption valve from the outlet of a gas cylinder.
Figure 61:
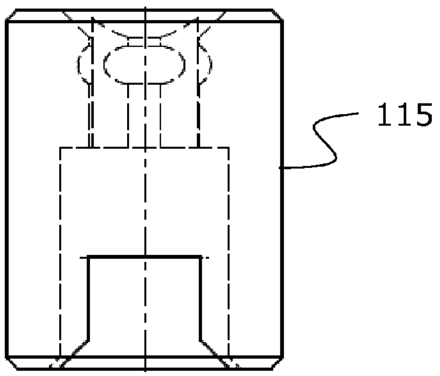
Figure 62:
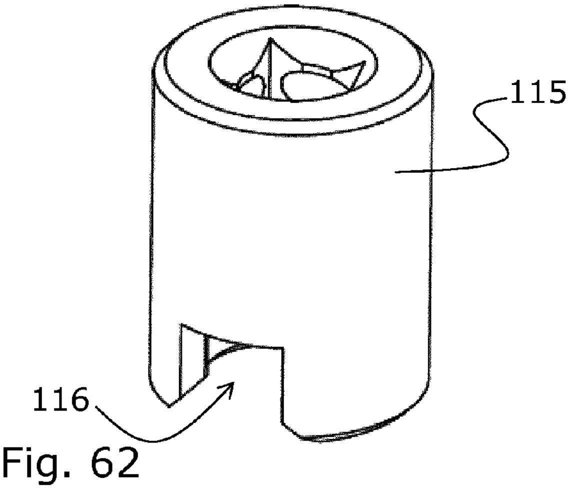
FIGS. 62-64 show the tool of FIGS. 60-61 being arranged in connection with the consumption valve.
Figure 63:
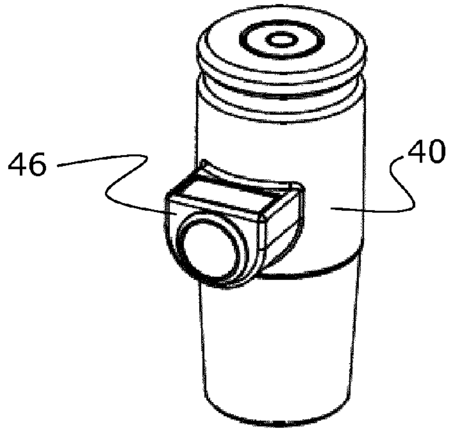
Figure 63:
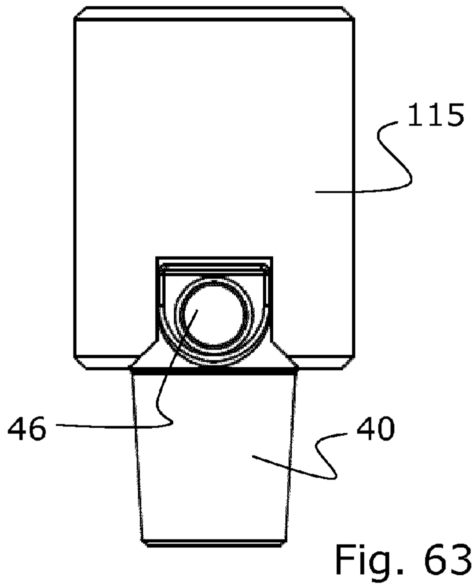
Figure 64:
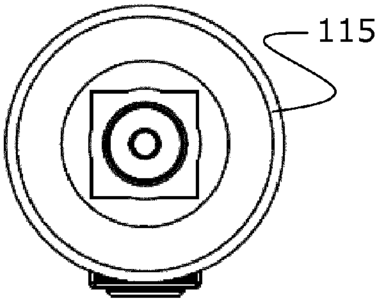

In FIGS. 60-61, a tool 115 adapted to connect and disconnect a consumption valve from the outlet of a gas cylinder is shown. In FIGS. 62-64, the tool 115 is arranged in connection with the consumption valve 40 by inserting the consumption valve 40 into the tool 115. The tool 115 has a recess 116 in which the pressure relief device 46 may be fitted so that a mechanical locking of the tool 115 and the consumption valve 40 is obtained. A winch or similar tool may be inserted at the top of the tool 115, facilitating the rotation of the consumption valve 40 when it is mounted or dismounted from the gas cylinder.

Figure 65:
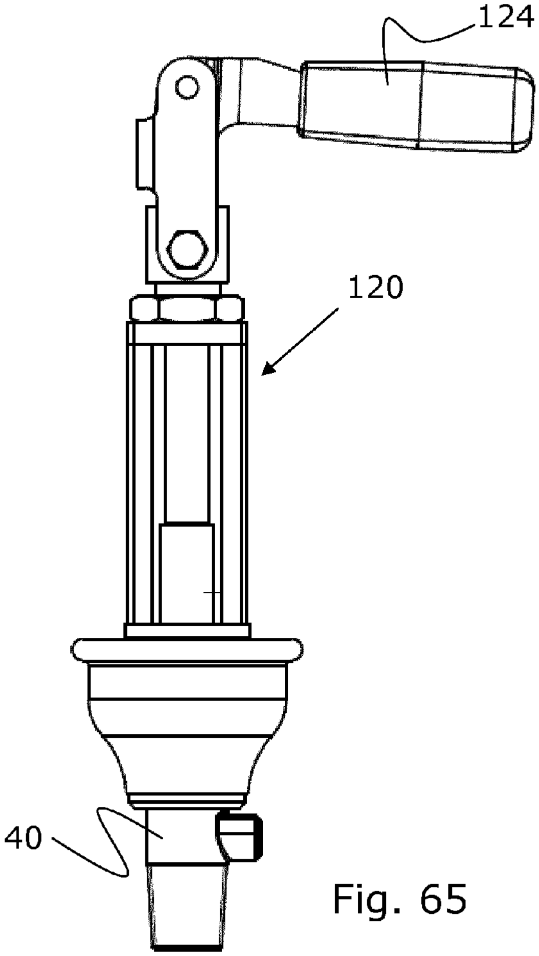
FIGS. 65-67 show a filling device adapted to be connected with the consumption valve and to open the consumption valve to a filling position.
Figure 66:
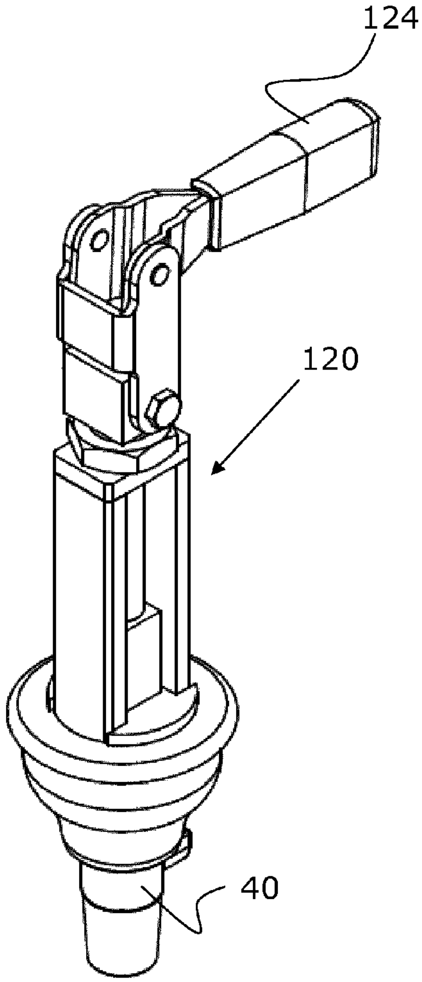
Figure 67:
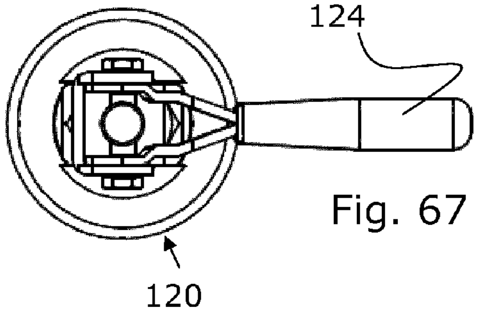
Figure 68:
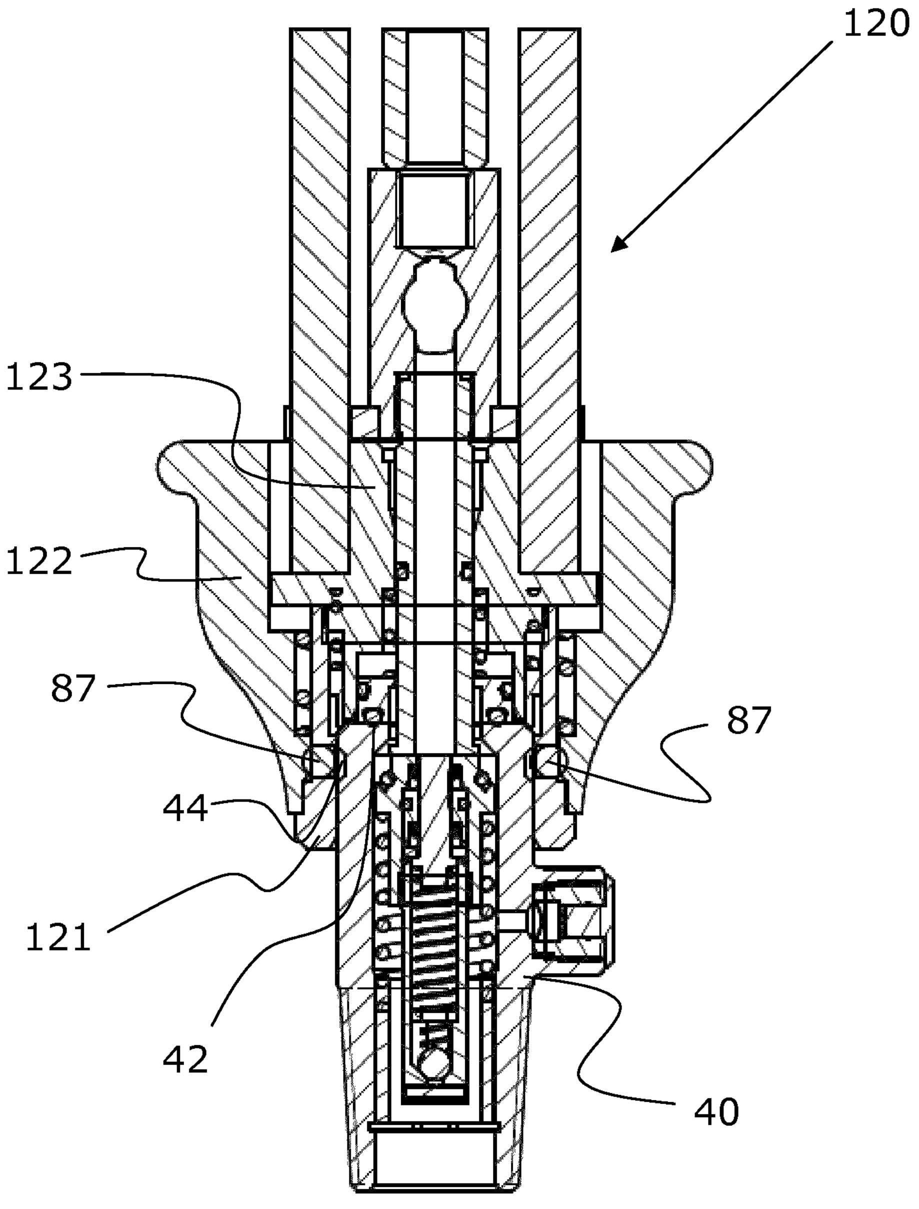
FIG. 68 shows the filling device of FIGS. 65-67 in a cross-sectional view.

FIGS. 65-67 show a gas filling device 120 adapted to be connected with the consumption valve 40 and to open the external gas filling valve of the consumption valve to a filling position. In FIG. 68, the gas filling device 120 is shown in a cross-sectional view. The gas filling device 120 comprises a collar 121 substantially having the same design as the collar of the pressure regulator device as described above, and the displaceable collar 121 is, in the same manner, adapted to engage the second end 42 of the consumption valve 40. The collar 121 also has balls 87 adapted to be displaced radially inwards by means of the connection handle 122 when it is displaced downwards, so that the balls 87 are projecting and engaging the groove 44.

The gas filling device 120 also comprises a plunger 123 connected with the handle 124 as shown in FIGS. 65-67. When the handle 124 is activated and displaced downwards, the plunger 123 is also displaced downwards whereby the external gas filling valve 48 of the consumption valve 40 is displaced downwards and opened accordingly. Hereby it is possible to refill the gas cylinder with gas in the most expedient manner. As mentioned above, the gas filling device may be activated manually by means of the handle. However, in other embodiments the activation may be performed automatically.

Advantageously, in relation to the connection means, an acoustic click indicator sending a signal when the connector is correctly connected to the outlet of the reduction valve and/or a visual indicator for indicating when the connector is correctly connected to the outlet of the reduction valve is/are arranged.

The first gas pressure is the pressure in the gas cylinder, and the second gas pressure is the same gas pressure reduced to a predetermined level, which could be an intermediate pressure, which facilitates handling of the gas cylinders. Alternatively, the second gas pressure could be the pressure to be used in the consumer system. However, the second gas pressure may also be reduced to a third gas pressure being the pressure to be used in the consumer system.

The first gas pressure may for instance be as high as 250 bar. The second pressure may be anything between 1 to 80 bar, however, often around 35 bar. The third gas pressure may be below 7 bar.

When the pressure delivery system is used for delivering a gas pressure in a beverage dispensing system, the following combinations may be applied as non-limiting examples:

a) The first gas pressure (e.g. 60 bar), i.e. the pressure in the gas cylinder, is reduced to the second gas pressure (e.g. 10 bar) via the reduction valve which is part of the gas cylinder. Subsequently, the second gas pressure is reduced to a third gas pressure (e.g. less than 7 bar) by means of a regulation valve which is part of the connector, said connector being connected to the outlet of the reduction valve of the gas cylinder, as shown in FIGS. 1 (axial connection) and 3 (radial connection). In this embodiment, the second gas pressure is the gas pressure to be used in the beverage dispensing system.

b) The first gas pressure (e.g. 60 bar), i.e. the pressure in the gas cylinder, is led via an on/off valve of the gas cylinder to a connector having one or more reduction valves in order to be reduced to the second gas pressure (e.g. less than 7 bar), as shown in FIGS. 1 (axial connection) and 3 (radial connection). In this embodiment, the second gas pressure is the gas pressure to be used in the beverage dispensing system.

c) The first gas pressure (e.g. 60 bar), i.e. the pressure in the gas cylinder, is led via an on/off valve of the gas cylinder to an adaptor unit having a reduction valve, which reduces the first gas pressure to a second gas pressure (e.g. 10 bar). Subsequently, the second gas pressure is reduced to a third gas pressure (e.g. less than 7 bar) by means of a regulation valve being part of the connector, said connector being connected to the outlet of the adaptor unit. In this embodiment, the third gas pressure is the gas pressure to be used in the beverage dispensing system.

d) The first gas pressure (e.g. 60 bar), i.e. the pressure in the gas cylinder, is led via an on/off valve of the gas cylinder to an adaptor unit connected to the on/off valve. A connector having one or more reduction valves is connected to the outlet of the adaptor unit and reduces the first gas pressure to the second gas pressure (e.g. less than 7 bar). In this embodiment, the second gas pressure is the gas pressure to be used in the beverage dispensing system.

Although the invention has been described in the above in connection with preferred embodiments of the invention, it will be evident for a person skilled in the art that several modifications are conceivable without departing from the invention as defined by the following claims.

The invention claimed is:

1. A pressure delivery system for delivering a gas, comprising a gas cylinder containing at least one gas, the gas cylinder comprising an outlet, and the gas in the gas cylinder having a first gas pressure, the pressure delivery system further comprising a pressure reduction valve positioned downstream of the outlet for reducing the first gas pressure to a second gas pressure, wherein:

a first valve is arranged downstream of the outlet of the gas cylinder, the first valve is a consumption valve adapted to be opened by an external pressure body, and the consumption valve is a double valve comprising an internal gas valve and an external gas filling valve arranged concentrically around the internal gas valve.

2. A pressure delivery system according to claim 1, wherein the pressure reduction valve is arranged in the first valve.

3. A pressure delivery system according to claim 2, wherein the pressure reduction valve is arranged upstream the internal gas valve of the consumption valve so that the first pressure of the gas in the gas cylinder is reduced to a second pressure before leaving the consumption valve.

4. A pressure delivery system according to claim 1, wherein the pressure reduction valve is releasably connected to the gas cylinder.

5. A pressure delivery system according to claim 1, wherein the pressure delivery system comprises an adaptor unit adapted to be connected to the outlet of the gas cylinder or the first valve.

6. A pressure delivery system according to claim 5, wherein the pressure reduction valve is part of the adaptor unit.

7. A pressure delivery system according to claim 1, wherein the system comprises a connector or a pressure regulator device adapted to be connected to an outlet of the pressure reduction valve, the adaptor unit or the first valve.

8. A pressure delivery system according to claim 7, wherein the pressure reduction valve is part of the connector or the pressure regulator device.

9. A pressure delivery system according to claim 7, wherein at least one of the pressure reduction valve, the adaptor unit or the first valve, the connector or the pressure regulator device comprises a corresponding connection structure so that connection is facilitated.

10. A pressure delivery system according to claim 7, wherein the pressure reduction valve, the adaptor unit or the first valve comprises a male part and the connector or the pressure regulator device comprises a female part, or vice versa.

11. A pressure delivery system according to claim 7, wherein the male part comprises locking means adapted to mechanically engage corresponding locking means arranged in the female part.

12. A pressure delivery system according to claim 7, wherein the connector or the pressure regulator device comprises (a) an acoustic click indicator sending a signal when the connector is correctly connected to the reduction valve, the first valve or the adaptor unit and/or (b) a visual indicator for indicating when the connector or the pressure regulator device is correctly connected to the reduction valve, the first valve or the adaptor unit.

13. A pressure delivery system according to claim 1, wherein the pressure reduction valve is part of the gas cylinder.

14. A pressure delivery system according to claim 1, wherein a residual pressure mechanism is arranged in the gas cylinder, the residual pressure mechanism being adapted to protect the gas cylinder when the gas pressure present in the gas cylinder drops below a predetermined level.

15. A pressure delivery system according to claim 1, wherein the consumption valve comprises a first end adapted to be connected with the outlet of the gas cylinder and a second end opposite the first end, the first end comprising a male thread area adapted to be screwed into a female thread area arranged in the outlet of the gas cylinder, the second end comprising a groove extending around an outside face of the valve, and the groove being adapted to engage with a projection of a connecting part.

16. A pressure delivery system according to claim 1, comprising a consumer system utilising the gas in the gas cylinder, wherein the consumer system is a beverage dispensing system, a welding system, a medical dispensing system, or a similar system.

17. A dispensing system for dispensing beverages, comprising a pressure delivery system according to claim 1.

* * * * *